United States Patent
Socek et al.

(10) Patent No.: US 9,584,814 B2
(45) Date of Patent: Feb. 28, 2017

(54) CONTENT ADAPTIVE BACKGROUND FOREGROUND SEGMENTATION FOR VIDEO CODING

(71) Applicant: Intel Corporation, Santa Clara, CA (US)

(72) Inventors: Daniel Socek, Miami, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 14/277,897

(22) Filed: May 15, 2014

(65) Prior Publication Data

US 2015/0334398 A1    Nov. 19, 2015

(51) Int. Cl.
| | |
|---|---|
| *H04N 19/146* | (2014.01) |
| *H04N 19/23* | (2014.01) |
| *H04N 19/20* | (2014.01) |
| *H04N 19/186* | (2014.01) |
| *H04N 19/182* | (2014.01) |
| *G06T 7/00* | (2006.01) |
| *H04N 19/17* | (2014.01) |
| *H04N 19/124* | (2014.01) |
| *H04N 19/167* | (2014.01) |

(52) U.S. Cl.
CPC ......... *H04N 19/146* (2014.11); *G06T 7/0081* (2013.01); *G06T 7/0097* (2013.01); *H04N 19/182* (2014.11); *H04N 19/186* (2014.11); *H04N 19/20* (2014.11); *H04N 19/23* (2014.11); *G06T 2207/10016* (2013.01); *G06T 2207/20036* (2013.01); *G06T 2207/20144* (2013.01); *G06T 2207/20224* (2013.01); *H04N 19/124* (2014.11); *H04N 19/167* (2014.11); *H04N 19/17* (2014.11)

(58) Field of Classification Search
CPC .. H04N 19/146; H04N 19/182; H04N 19/186; H04N 19/20; H04N 19/23; H04N 19/124; H04N 19/167; H04N 19/17; G06T 7/0079
USPC .................................................... 375/240.26
See application file for complete search history.

(56) References Cited

U.S. PATENT DOCUMENTS

| | | | | |
|---|---|---|---|---|
| 5,274,715 A | * | 12/1993 | Hsu ........................ | G06T 7/403 382/109 |
| 6,160,848 A | * | 12/2000 | Sivan ..................... | H04N 19/61 375/240.13 |
| 8,411,149 B2 | * | 4/2013 | Maison .............. | G06K 9/00369 348/207.1 |
| 2006/0170769 A1 | | 8/2006 | Zhou | |
| 2009/0060277 A1 | | 3/2009 | Zhang et al. | |
| 2011/0002555 A1 | | 1/2011 | Sodagar | |
| 2011/0013836 A1 | * | 1/2011 | Gefen ..................... | G06T 7/204 382/171 |
| 2013/0242095 A1 | | 9/2013 | Lipton et al. | |

(Continued)

OTHER PUBLICATIONS

Liyuan Li, et al., "Statistical Modeling of Complex Backgrounds for Foreground Object Detection", IEEE Transactions on Image Processing, vol. 13, No. 11, Nov. 2004, pp. 1459-1472.

(Continued)

*Primary Examiner* — William C Vaughn, Jr.
*Assistant Examiner* — Jae N Noh
(74) *Attorney, Agent, or Firm* — Green, Howard, & Mughal LLP

(57) ABSTRACT

Techniques related to content adaptive background-foreground segmentation for video coding.

25 Claims, 18 Drawing Sheets

(56) References Cited

U.S. PATENT DOCUMENTS

2013/0278788 A1 10/2013 Levy
2015/0117784 A1* 4/2015 Lin .................... G06K 9/4671
   382/195

OTHER PUBLICATIONS

Alessandro Parolin, et al., "Bilayer Video Segmentation for Videoconferencing Applications", in Proc. of IEEE ICME 2011, 6 pages.
Chris Stauffer, et al., "Learning Patterns of Activity Using Real-Time Tracking", in IEEE, Trans. Pattern Analysis and Machine Intelligence, vol. 22, 2000, pp. 1-17.
International Search Report and Written Opinion for PCT/US2015/027885, mailed Aug. 5, 2015, 12 pages.
International Preliminary Report on Patentability for International Patent Application No. PCT/US2015/027885, mailed on Nov. 24, 2016.

* cited by examiner

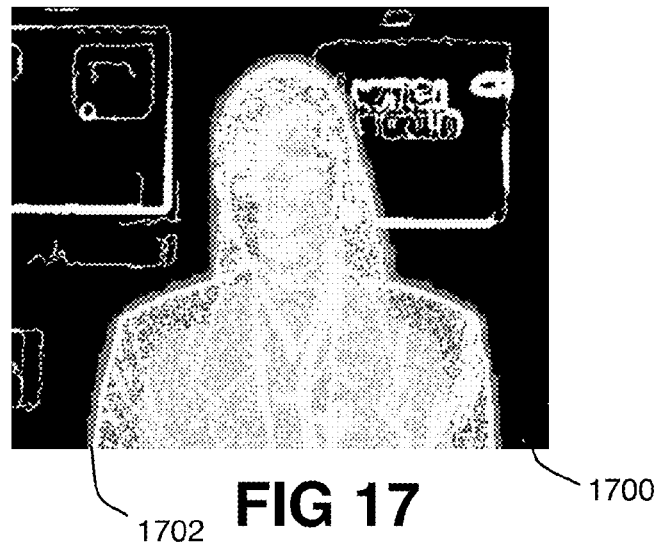
FIG 17
FIG 18
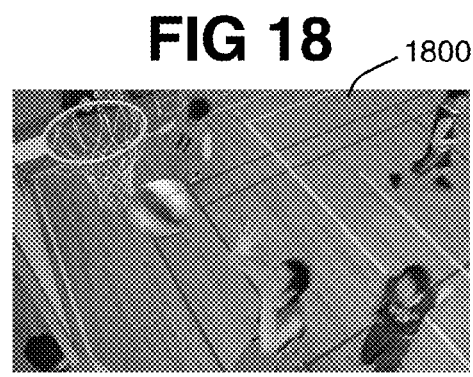
FIG 19
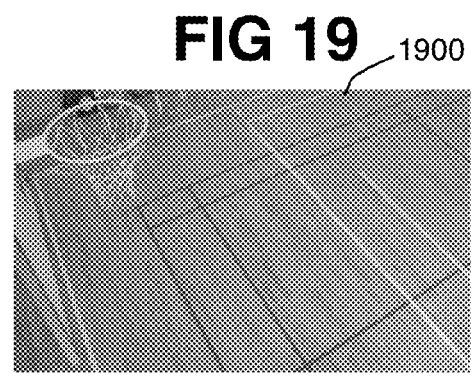
FIG 20
FIG 21

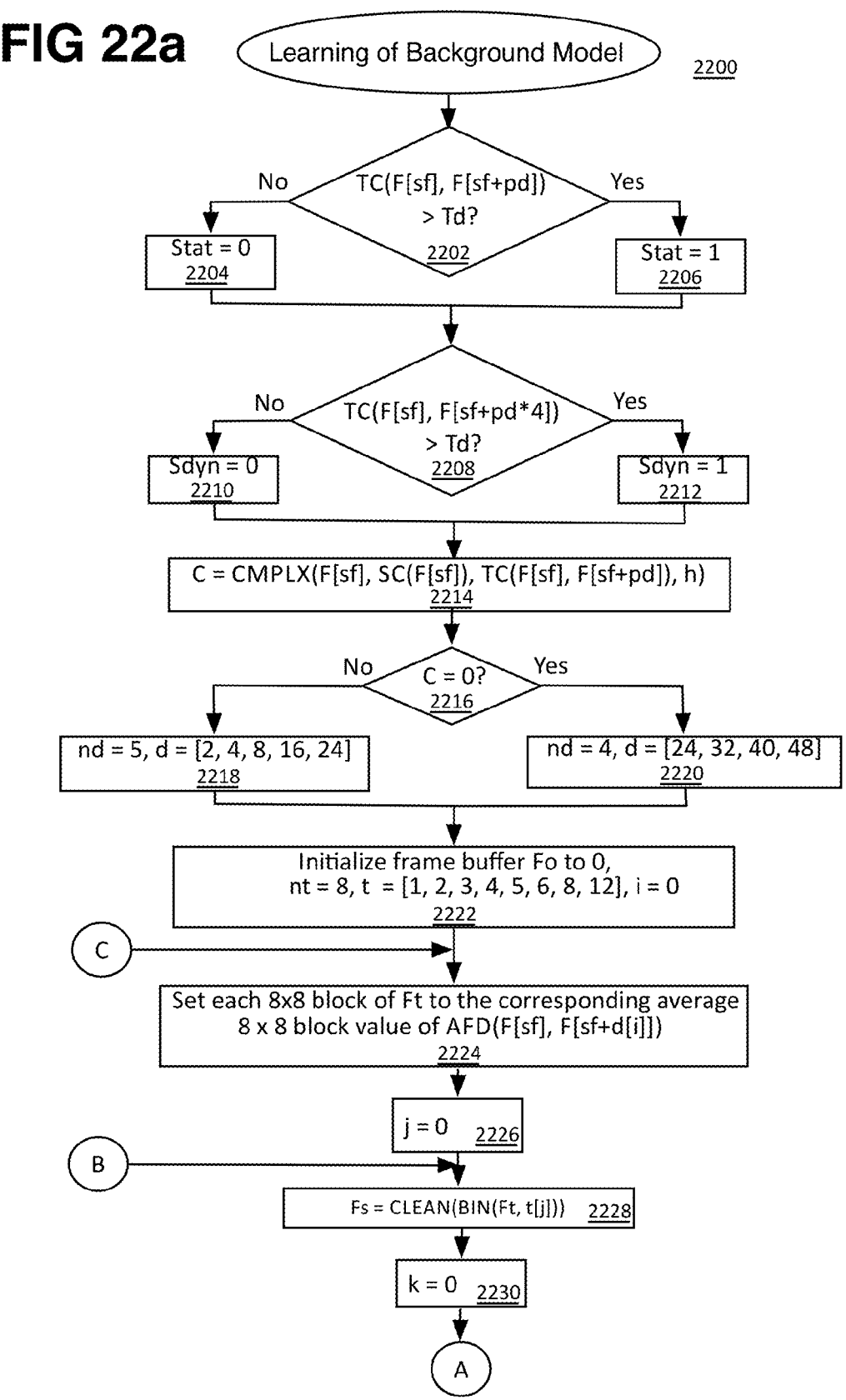

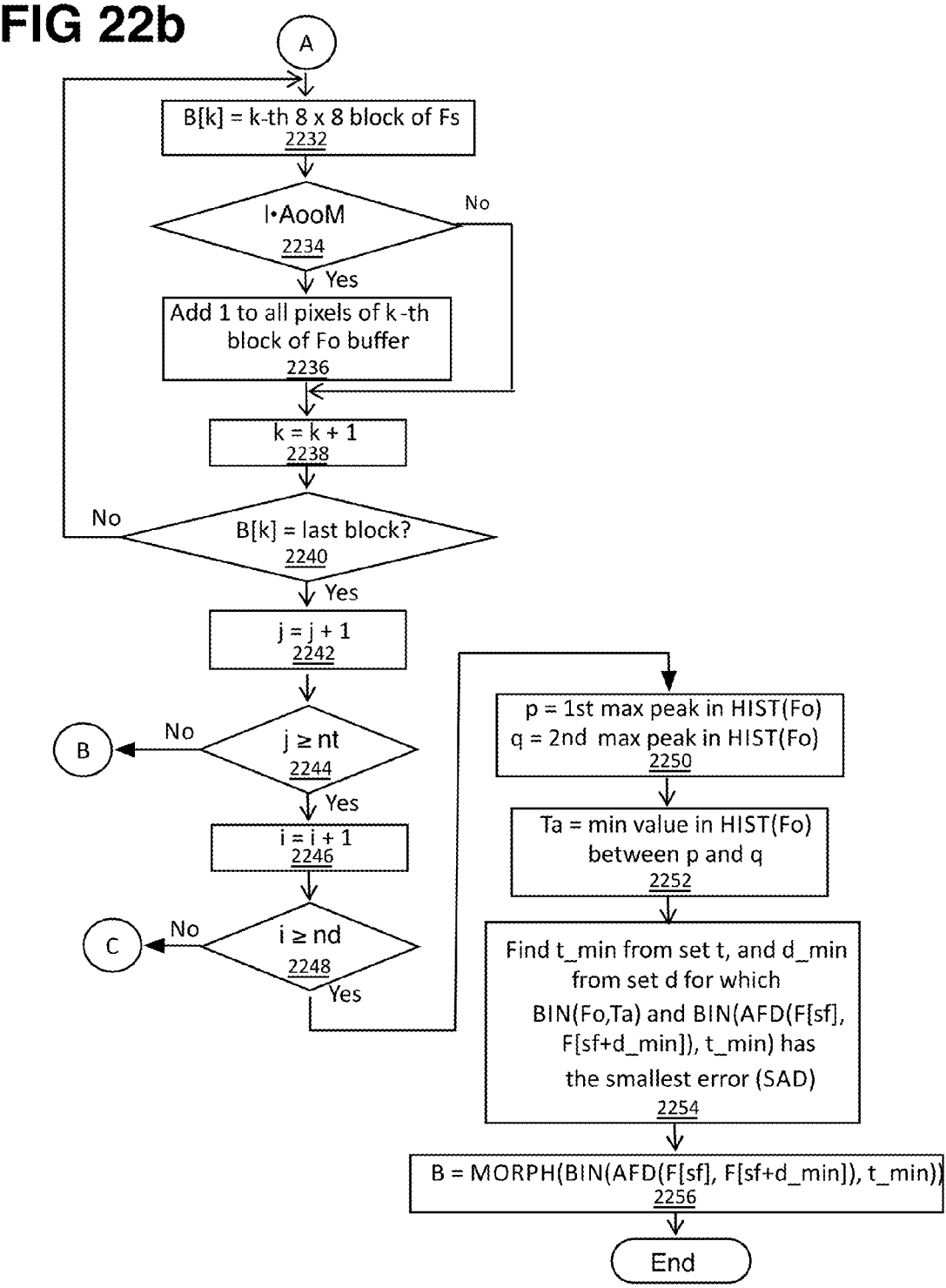

TABLE 1

| Measurements from Test Sequences | | | Best Scene Classif-ication (Distance for Background Model) |
|---|---|---|---|
| Picture height (h lines) | Spatial complexity (SC) | Temporal complexity (TC) | |
| DVD/SD (> 352) | 5.9-6.0 | 0.8-0.9 | High Complexity (use nearby frames) |
| DVD/SD (> 352) | 10.4-10.6 | 1.5-1.6 | |
| DVD/SD (> 352) | 11.0-11.2 | 4.3-4.4 | |
| DVD/SD (> 352) | 12.5-13.0 | 1.2-1.8 | |
| LD (<=352) | 18.8-19.0 | 3.5-3.7 | |
| DVD/SD (> 352) | 33.7-33.8 | 1.3-1.4 | |
| Otherwise | | | Low Complexity (use farther frames) |

FIG 25

TABLE 2

| Condition | Settings | | |
|---|---|---|---|
| Picture Height (h lines) | ROI Inner Width | ROI Outer Width | ROI Segment Length |
| HD or higher (e.g. >= 1080 lines) | 42 | 16 | 24 |
| Less than HD (e.g. <1080 lines) | 26 | 6 | 16 |

FIG 26

TABLE 3

| Condition | Settings | |
|---|---|---|
| w*h | Minimum Object Size | Smoothing Binary Filter Length |
| < 150000 | 50 | 1 |
| < 500000 | 300 | 4 |
| < 1500000 | 750 | 8 |
| Otherwise | 2500 | 12 |

CONTENT ADAPTIVE BACKGROUND FOREGROUND SEGMENTATION FOR VIDEO CODING

BACKGROUND

In order to provide good quality video images, and provide improved, new generation video codec applications, some desirable attributes of video codec include (1) the ability to maximize perceived video quality of important regions in an image given limited video coding bitrate or bandwidth, and (2) the ability to enable object-based video codec where objects in an image are detected to adjust codec precision accordingly. While the first attribute, at least to some extent, can be addressed by normal video coding (meaning coding without using region segmentation-based coding) and by video coding standards such as H.264, scalable video coding (SVC), High Efficiency Video Coding (HEVC), or scalable HEVC (SHVC), or by non-standard alternative video codecs such as VP8 and VP9 to name a few examples. However, to get the best results with these standards, awareness of important regions (region segmentation) may be necessary. Further, in principle, a standard such as MPEG-4 that supports explicit coding of objects is necessary to achieve the second attribute. However, the standards, be it MPEG-4, H.264 or HEVC, only describe bitstream syntax and decoding semantics, and only loosely mandate details of an encoder, much less details of segmentation. Further segmentation of video, though desirable in enabling advanced applications, can be computationally complex and very context dependent. This is further complicated because the standards do not cover segmentation of video.

In limited bandwidth video coding, quantization adapted to human perceptual and/or visual requirements can be used to achieve improved video quality as perceived by the users. Specifically, in video encoding, luma and chroma pixel values may be transformed into frequency coefficients, such as discrete cosine transform coefficients, that are then quantized or rounded to certain values in order to reduce the unnecessary precision in the coefficients beyond what is detectable by the human eye. For example, the human eye is less sensitive to color than brightness, and the human eye can only notice a certain level of difference in brightness and color. Thus, to improve perceived image quality, several processes may be exploited such as but not limited to (1) identifying highly textured areas where more noise can be added without adding visually noticeable artifacts, (2) identifying areas of very high or very low brightness, where somewhat higher quantization artifacts can be hidden, (3) identifying frames just before or just after scene cuts where more quantization noise can be introduced without it being very visible, and (4) identifying areas of focus such as human faces and other objects within a video that are likely of higher interest (region of interest (ROI)) such that ROI areas can be coded with finer quantization and better quality, such as a foreground, while other areas are coded with relatively lower quality, such as a background.

This last technique is especially relevant in the context of certain applications such as video conferencing, video chats, and other applications including applications that use foreground overlays on a background. For these examples, the segmentation of a usually static, or at least more static, background (BG) from usually moving human head and shoulders, or other overlay objects, in a foreground (FG) is used to concentrate the fine coding on the foreground to improve the coding. While many general techniques for segmentation of foreground from background are available, most of the techniques are either compute intensive, or poorly perform the segmentation of background from foreground, or both. With better quality practical segmentation, the available limited coding bandwidth can be better directed at the ROI, such as to improve the human or other foreground objects in the scene, thereby giving a perceived overall improvement in image quality.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 17 is a final image showing background-foreground segmentation using the background-foreground segmentation process herein;

FIGS. 18-21 show images illustrating various operations in the segmentation loop phase of a background-foreground segmentation process;

FIGS. 22A-22B is a detailed flow chart for the background model learning phase of a background-foreground separation process;

FIG. 25 is a table 2 of segmentation settings based on video resolution for ROI-specific parameters;

FIG. 26 is a table 3 of settings for segmentation mask cleaning;

DETAILED DESCRIPTION

Figure 1:
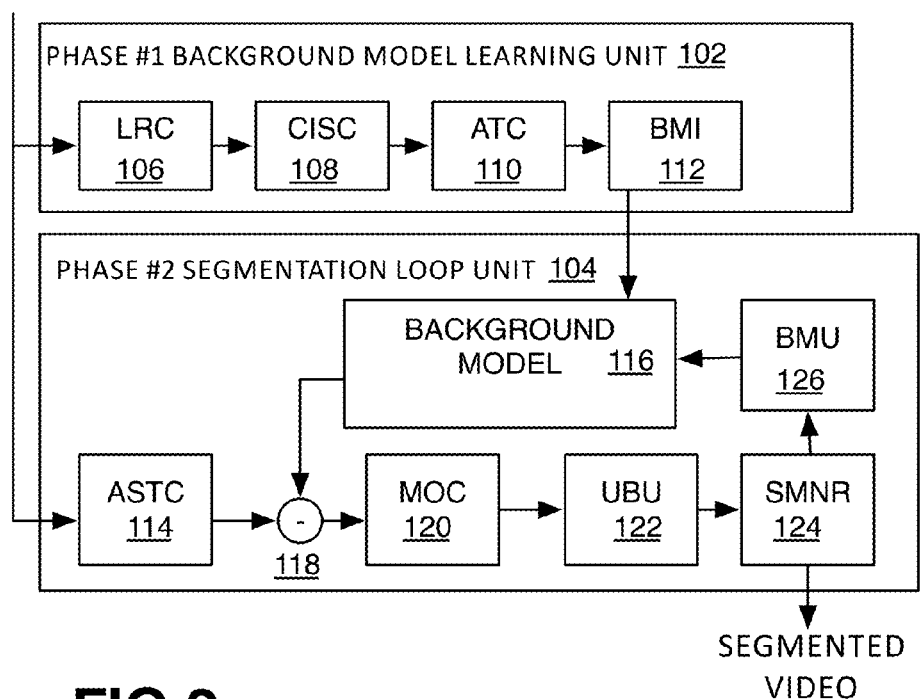
FIG. 1 is an illustrative diagram of a video coding system for background-foreground segmentation.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to content adaptive background-foreground segmentation for video coding.

As mentioned above, one way to improve the perceived quality of an image is to identify which parts of the image are in the background (BG) and which parts of the image are in the foreground (FG) so that the background can be coded with less detail to provide greater bandwidth to code the foreground in more detail. This is often provided in scenes with static backgrounds and where the foreground is the head and shoulder of one or more people such as with video conferences. Besides video conferencing, more efficient background-foreground segmentation is beneficial for other applications as well, such as region of interest (ROI) coding, surveillance, flexible multimedia compositions, and others. In some cases, it may be desirable to superimpose a foreground on alternate replacement background scenes or backgrounds that have been modified. In other cases, information such as a biography or statistics about participants or objects in the scene may be provided as overlays in the scene. This requirement may not necessarily be limited to video conferencing scenes but applicable to many different types of scenes. Such scenes may require background segmentation from foreground objects in order to manipulate the foreground separately from the background and determine which parts of the image are covered or uncovered by the objects.

In the context of video conferencing, by one example, a background may be sent only once to a decoder to be used in multiple scenes in order to save bandwidth. Similarly, an alternate background image or video may be provided separately or the background may be generated by other methods for use with a foreground that had a different original background. In all of these cases, only the coded foreground objects may be sent to the decoder for a new image. If the bandwidth for sending the data for the shape of the foreground objects can be kept low while the code for the background texture information is omitted or substantially reduced for the new image, then more bandwidth is available to provide detailed foreground texture information to the decoder which may result in a higher perceived image quality.

Thus, one fundamental goal of a video segmentation algorithm is to classify frame pixels (or blocks) as either foreground or background. In a background modeling-based segmentation, the background is modeled and estimated over a number of previously analyzed frames, forming an ongoing scene for example, and then subtracted from the current frame (herein the terms frame, picture, and image are used interchangeably). For example, this can be performed by using one of several approaches such as histogramming, using average/median values, probability function curves, and forming thresholds for the differences in pixel value (such as luma and chroma values) from frame to frame, or over a number of frames. This is based on the idea that foreground moving objects will cause large differences in pixel values among frames while the background is expected to maintain small differences in pixel values among the frames. This type of approach is suitable in scenes with a relatively static camera, such as video conferencing and similar applications.

Two known background modeling segmentation algorithms include Mixture of Gaussians (MoG) approach, and Filtered Probabilistic Distribution Functions (FPDF) approach. The MoG approach uses multiple evolving Gaussian distributions as a model for the values of the background pixels. The MoG approach includes modeling the recent history of each pixel, $\{X1, \ldots, Xt\}$, as a mixture of K Gaussian distributions. Every new pixel X is checked against existing K Gaussian distributions until a match is found (i.e. until value of X is within a standard deviation threshold of a distribution). If no match is found, the least probable distribution is replaced with a new distribution with X as a mean and with an initial high variance. This approach provides good foreground object segmentation results for many indoor and outdoor sequences. However, the performance of the MoG approach in sequences with periodic background movement is still poor. The shape of the probability distribution functions (PDFs) that the MoG approach is trying to estimate can be any shape that can be approximated with a predetermined number of Gaussian curves. In fact, with an infinite number of Gaussian curves, one can approximate any curve. But for reasons of computational complexity, the MoG approach typically uses a limited number of three to five Gaussian distributions for modelling. This yields a rather inaccurate approximation of the PDFs, and is one of the main reasons behind the poor performance in complex sequences.

To better handle such sequences, the FPDF segmentation approach is a hybrid of filtering and probabilistic approaches. In the FPDF approach, the initial segmentation is filter-based, and the model maintains a reference background image as a model of the background. It can be performed by approaches such as a low-pass Infinite Impulse Response (IIR) filter applied to the sequence of frames. One FPDF approach addresses the inability of the typical filter-based approaches to differentiate between the movements of the foreground objects and background objects in complex scenes. In the FPDF approach, the model detects the PDFs of the pixel values in the initial segmentation. The FPDF model is able to distinguish between the errors in the initial segmentation and the true foreground pixels. For example, this can be accomplished by using the PDFs that are updated in time, and a Bayes' rule based decision framework that is formulated based on the assumption that the pixel values observed more often at a single pixel are more likely to be background.

While these two approaches have fair to adequate segmentation results in many surveillance types of sequences, these approaches perform very poorly for the first few hundred frames of a sequence before the model is established. In addition, during testing, many sequences from a video-conferencing realm produced highly inaccurate results. Moreover, both of these approaches are very slow if applied to a higher resolution video (such as 1080p or higher). A typical personal computer (PC) implementation yields a few frames per second for a common intermediate format (CIF) resolution, which does not meet typical modern video application requirements.

In order to address these disadvantages, experiments were performed with a known proposed multi-stage background (MSB) modeling segmentation approach that attempts to provide a faster learning rate for modern video conferencing types of applications (see, A. Parolin, G. P. Fickel, C. R. Jung, T. Malzbender, and R. Samadani, "*Bilayer video segmentation for videoconferencing applications*," in Proc. of IEEE ICME 2011). In this MSB approach, object detection such as a face tracking algorithm is used to guide a generic Ω-shaped template of the head and shoulders. Then, a region of interest (ROI) is created around the generic template, and an energy function based on edge, color, and motion cues is used to define the boundary between the person and the background. The background modeling in the MSB approach is used as a component of the tracking stage. The MSB approach relies on face detection and tracking algorithm to determine participants in a video conference. When a face is detected within a frame, the position and size of a face is used to define a generic Ω-shaped template representing the head and shoulders region. The template is re-scaled and superimposed to the frame, defining the ROI. Given the template-based ROI, the silhouette of the object is a curve inside the ROI that maximizes a certain energy function which is large on the object boundary and small otherwise. In the MSB approach, the problem of finding the object boundary is formulated as a maximum cost path in a graph, and Dijkstra's algorithm is proposed to find the path in order estimate the object boundary. One key part in this process is the energy map which guides the shortest path. The MSB approach relies on all three cues for energy function: edges, color and motion. The edge cue information is extracted using a Sobel operator, motion cue relies on consecutive frame differencing with threshold set to 10/255, and the color cue is based on color spatiogram (which is a histogram with added spatial information). The final energy map is determined as a weighted sum of these three cues, where weights were experimentally set to 0.1 for edge cue, 0.7 for motion cue, and 0.2 for color cue. A key issue in determining the quality and/or performance of the above technique is in having an identical facial detection system as that used by the technique. Similar to generalized segmentation, face detection can be computationally complex, with results that are context dependent.

In the experiments using the MSB approach, the following shortcomings were observed: (1) the MSB approach is too tuned to head and shoulders types of scenes and performs poorly when applied to other types of scenes, (2) the tracking algorithm used by the MSB approach is expensive and slows down the segmentation process such that the MSB approach is only applicable to smaller resolution sequences, and (3) the energy map used to pinpoint the estimated boundary within the tracking region around the object seems too simplistic for more general cases and yields visible segmentation errors when applied on a test set of talking head/head and shoulders sequences.

The aforementioned shortcomings of the known approaches are overcome by the present background-foreground segmentation process that provides high quality images while reducing the complexity of the process. The present background-foreground segmentation process is a multi-stage method that uses at least two phases including one phase to quickly learn an initial, accurate background model. Then, in a segmentation loop phase, a background subtraction technique is followed by morphological operators. Also, instead of using ROI and other cues to directly discern the region boundary which is prone to visible estimation errors, the present segmentation process merely uses ROI-based type of analysis as a post-processor to re-classify uncovered background from foreground pixels by using multiple cues (such as Canny edge cues, gradient cues, and motion-based cues) within the marked ROI. This strategy reduces or eliminates the need for (1) using face trackers to determine a rough ROI estimate and then (2) relying on simplistic cues to determine actual estimates of the region boundary. The computed background is then used to update the background model and the process continues onto the next frame.

Figure 31:
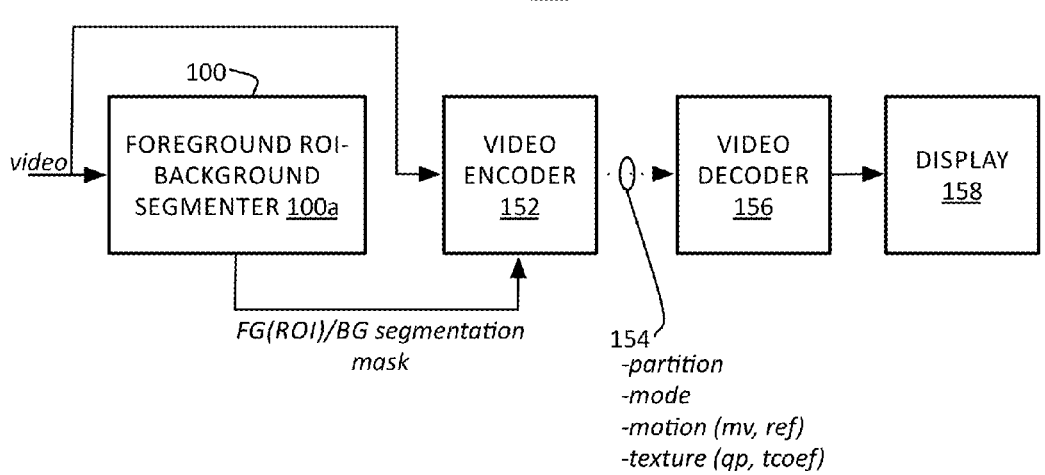
FIG. 31 is an illustrative diagram of a video codec system according to at least some of the implementations herein.
Figure 32:
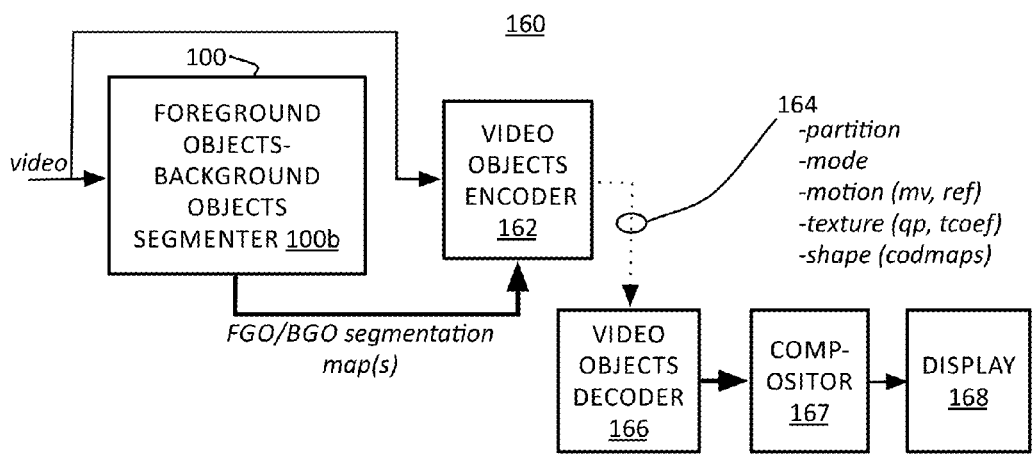
FIG. 32 is an illustrative diagram of another video codec system according to at least some of the implementations herein.

Referring to FIGS. 1 and 31-32, a video coding system 150 or 160 for coding of a video sequence may each have background-foreground segmentation system (or module or unit) 100 to perform background-foreground segmentation. The background-foreground segmentation system 100 may be a computer-implemented system and may be considered separate from an encoder 152 or 162 that receives a segmentation mask or map from the background-foreground segmentation system 100. In other alternatives, the background-foreground segmentation system 100 may be considered to be part of, or may have, an encoder 152 or 162, and/or the system 100 may be, or may have, a controller for a coder. Many variations are possible as long as the segmentation system 100 receives pixel data of images (or frames) in a video sequence. Thus, the original video provided may include luma values and/or chroma values in a number of different video coding protocols including YUV, YCbCr, and so forth, and is not particularly limited as long as it includes images having background and foreground parts. The foreground/background segmentation produced by segmentation system 100 may be compatible with many different coding standards such as MPEG, H.264, and HEVC as well as non-standard alternative video codecs such as VP8 and VP9 to name a few non-limiting examples and as mentioned below.

Thus, the segmentation system 100 may provide results, in the form of identification as to which pixels are in the background, and which pixels are in the foreground. This identification is often referred to as the segmentation mask (for a single foreground for example) or a segmentation map (for multiple foreground objects). Further, in one form, in addition to the segmentation mask or map, it may also output segmented frames. By one example, this may be performed during a pre-processing stage of video coding before the frames are divided into coding blocks and provided to a transform and quantization unit in a coder for example. The background may then be coded with less detail, and the foreground (region of interest/ROI) may be coded with more detail.

Referring to FIG. 31, the video coding system 150 has a foreground ROI/background segmenter 100a as the background-foreground segmentation system 100. In this form, the foreground ROI/background segmenter 100a receives a video sequence of frames or images that form one or more scenes, and then divides the background (BG) from a foreground region of interest (FG(ROI)). This forms a segmentation mask that indicates which pixels in an image are background and which are foreground. This is performed without using object detection on the image or scene and during the coding the video sequence. By one form, the segmentation mask may be a binary mask with 0's referring to background and 1's referring to foreground for example. The segmentation mask is provided to a video encoder 152 to encode the video data for transmission over a bitstream 154 to a video decoder 156. The video decoder 156 may then decode the coding data for viewing on a display 158.

The video encoder uses the segmentation mask to adjust the quantization parameters such as the qp to code the video sequence, which in turn affects the precision of the transform coefficients. As mentioned, the background pixels may be provided less precision while the foreground pixels may be provided with more precision. This may be performed on a block basis (where all pixels in the block receive the same value) or a pixel basis (where individual pixels in the same block may receive different segmentation values. The video encoder 154 transmits the partitions (or maps thereof), mode (such as intra-coding or inter-coding), motion data (such as the motion vectors (mv) and/or reference frame information (ref)), as well as the texture data such as the qp and tcoef. The segmentation mask itself need not be transmitted to the decoder since the segmentation mask is already considered by adjusting the qp values depending on the segmentation mask. The video decoder 156 then decodes the video data without the need for segmentation mask information data.

Referring to FIG. 32, by an alternative, the video coding system 160 has a foreground objects/background objects segmenter 100b as the background-foreground segmentation system 100. As with video coding system 150, the foreground objects (FGO)/background objects (BGO) segmenter 100b receives video data, and provides segmentation data to an encoder 162. In this case, however, the foreground objects/background objects segmenter 100b uses object detection, such as face detection for example, to define one or more objects to form multiple individual foregrounds, or to be treated collectively as a single foreground, and against a single large background. In this case, a segmentation map is formed that indicates the background and each of the individual foreground objects, such as 0 for background, 1 for one object, 2, for another object, and so forth. The segmentation map may be pixel based, or may have other basis that is more accurate than an 8×8 block, such as four-pixel accuracy, in an attempt to avoid a perceptible "blocky" or jagged image.

The segmentation map may be provided to the video objects encoder 162 that can then code each object independently of other objects by modifying the qp according to the segmentation map. The encoder 162 also forms shape data (codmaps) to locate and size the shape of individual detected objects in an image, and transmits the data over the bitstream 164, as well as partition, mode, motion, and texture data as described for video coding system 150. A video objects decoder 166 may then perform decoding on the data to reconstruct the background and foreground objects, and then a compositor 167 places the objects in the image, and by one example using the shape data. The image may then be viewed on a display 168. This configuration provides substantial flexibility to edit an image by modifying individual objects without affecting other objects in the image. Thus, one object may be made larger relative to the other objects, and so forth. Such a system uses a standard that is compatible with such object based coding such as MPEG 4.

Referring to FIG. 1, in more detail, the segmentation system 100 has at least two segmentation units 102 and 104 to run a segmentation algorithm in at least two phases. This includes a background model learning unit 102 that operates an initial phase to learn a background model, and in one case, an initial background model. A segmentation loop unit 104 operates another phase (a segmentation loop process) that produces the segmentation frames and updates the background model.

The background model learning unit 102 establishes an initial background model, initializes the model and provides it to the segmentation loop unit 104. Specifically, the background model learning unit 102 has a learning rate computation (LRC) unit 106 to establish reference frames to use for the background-foreground segmentation analysis, and a cumulative initial segmentation computation (CISC) unit 108 to form cumulative segmentation masks that indicate the pixel or block activity in a base frame. Also, an adaptive threshold calculation (ATC) unit 110 is provided to set a background threshold based on the segmentation masks, and a background model initialization (BMI) unit 112 to construct an initial background model based on the segmentation masks.

The segmentation loop unit 104 receives the original video in the form of pixel data as mentioned above, and has an adaptive segmentation threshold computation (ASTC) unit 114 to provide thresholds for background subtraction (BS) 116 using the background model 118 initialized by the background model learning unit 102. A morphological opening and closing (MOC) unit 120, an unknown background uncovering (UBU) unit 122, and a segmentation mask noise removal (SMNR) unit 124 are used to modify the model (by adding or subtracting from/to the background) or otherwise remove noise from the data. The revised model in the form of a segmented video (or frame) is then provided for coding, and is provided to a background model update (BMU) unit 126 for updating the background model 118. The loop is continued until the end of a scene or video sequence where the image is substantially changed.

Figure 2:
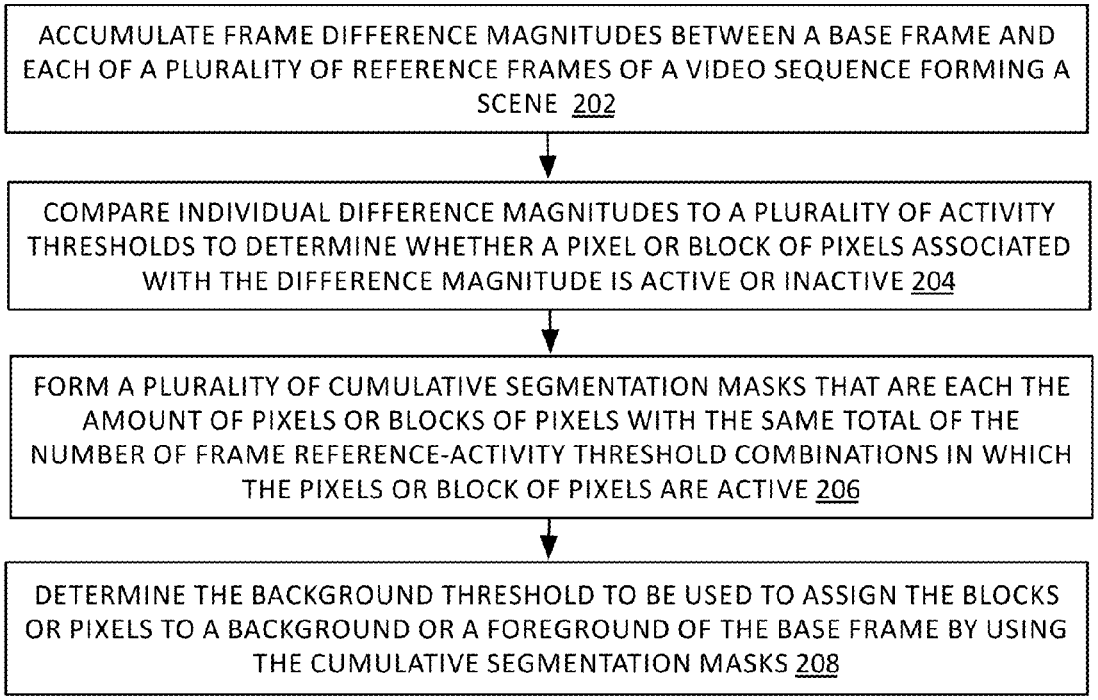
FIG. 2 is a flow chart showing a process for background-foreground segmentation.

Referring to FIG. 2, a flow chart illustrates an example process 200, arranged in accordance with at least some implementations of the present disclosure. In general, process 200 may provide a computer-implemented method for background-foreground segmentation for video coding that comprises learning a background model as mentioned above. In the illustrated implementation, process 200 may include one or more operations, functions or actions as illustrated by one or more of operations 202 to 208 numbered evenly. By way of non-limiting example, process 200 will be described herein with reference to operations discussed with respect to FIG. 1, above and may be discussed with regard to example system 100 or 2800 discussed below.

The segmentation process 200 may comprise "accumulate frame difference magnitudes between a base frame and each of a plurality of reference frames of a video sequence forming a scene" 202. The base frame may be a start frame or first frame of the video sequence or scenes within the video sequence but need not always be the very first frame. By one option, it is one of the beginning frames referring to a beginning portion of the video sequence or a scene within the video sequence. Otherwise, the base frame may be within the video sequence or scene within the video sequence where it is practical.

The segmentation process 200 also may comprise "compare individual difference magnitudes to a plurality of activity thresholds to determine whether a pixel or block of pixels is active or inactive" 204. Thus, each reference frame (or specifically, pixel or block of pixels) has a difference with the base frame, and each difference is compared to multiple complexity thresholds. The selection of these complexity thresholds is explained below.

The segmentation process 200 also may comprise "form a plurality of cumulative segmentation masks that each are the amount of pixels or blocks of pixels with the same total of the number of frame reference-activity threshold combinations in which the pixels or block of pixels are active" 206. Thus, a combination here is the difference with one reference frame and one of the complexity thresholds used with that reference frame. By one example, if five reference frames are used with eight thresholds, then there are forty combinations. The cumulative segmentation mask is a count of the number of blocks (or pixels) that are active in the same number of combinations. For example, there may 100 blocks that are active in 16 combinations, or there may be 1000 blocks that are active in all 40 combinations suggesting, by the number of combinations, that these blocks are foreground blocks, or there may be 1000 blocks that are merely active in one or two combinations suggesting these blocks are background blocks.

Figure 4:
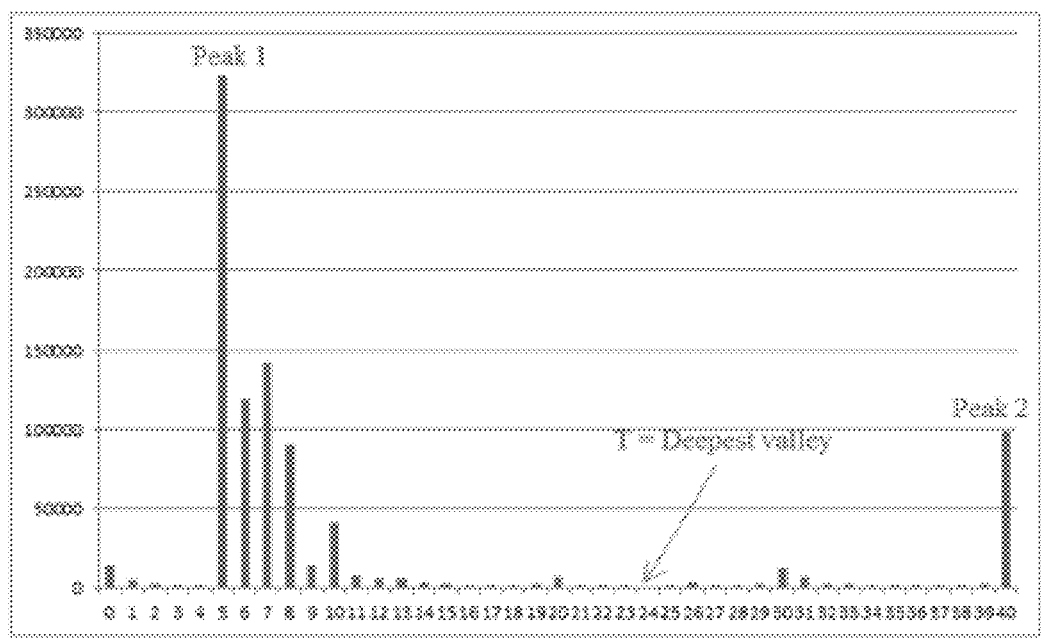
FIG. 4 is a chart showing peaks and valleys for a threshold approach of a background-foreground segmentation process.

The segmentation process 200 also may comprise "determine the background threshold to be used to assign the blocks or pixels to a background or a foreground of the base frame by using the cumulative segmentation masks" 208. By one example, explained below, the cumulative segmentation mask may be ordered by the number of active combinations, and the background threshold may be determined by analyzing the maximum and minimum number of blocks for a combination. This can be diagramed by peaks and valleys on a histogram (FIG. 4). By one example, the background threshold is determined by evaluating a number (0 to 40) combinations to determine the value that corresponds to the deepest valley. This is based on the idea that the high concentration (or peak) of pixels at a low number of active combinations on the chart represents the area of the background that does not vary significantly between active and inactive from frame to frame, while the peak at a higher number of active combinations represents foreground that does not vary significantly between active and inactive from frame to frame. The valley between the peaks with the lowest number of pixels at a certain number of active combinations suggests an area of large variations between active and inactive, which in turn suggest the boundary between the background-foreground areas of the frame. Thus, many other alternatives are contemplated, similar to, but different than selecting the lowest pixel total as the background threshold. This includes the valley being at a certain value of pixels, or being in a center of pixel (or block) totals that cooperatively form a valley, or the valley combination may be a certain distance (in combination number) from at least one of the peaks, or each peak, and so forth.

Figure 3:
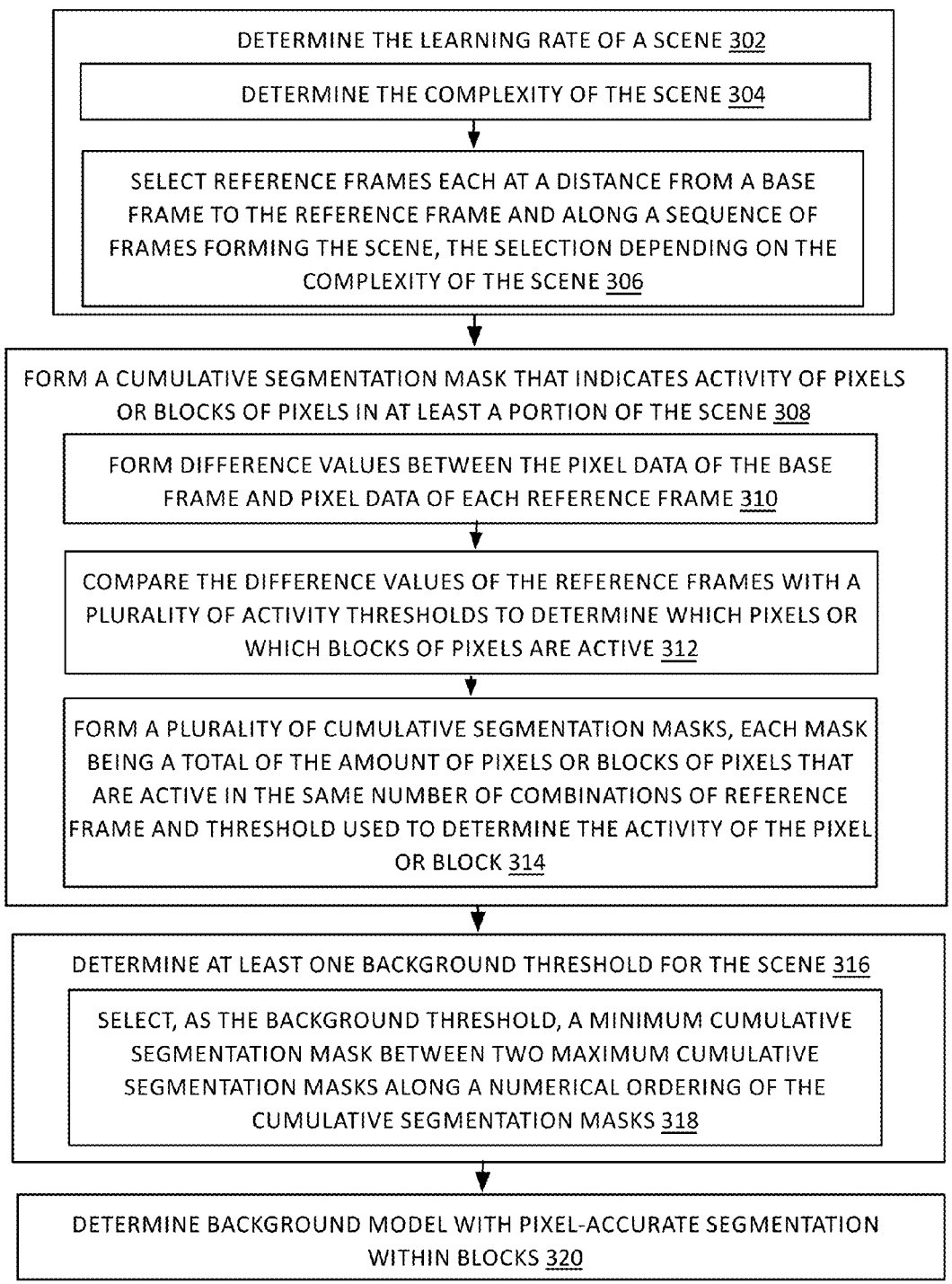
FIG. 3 is a flow chart showing a background model learning phase of a process for background-foreground segmentation.

Referring now to FIG. 3, a flow chart illustrates an example process 300, arranged in accordance with at least some implementations of the present disclosure. In general, process 300 may provide a computer-implemented method for background-foreground segmentation for video coding including a phase for learning a background model. In the illustrated implementation, process 300 may include one or more operations, functions or actions as illustrated by one or more of operations 302 to 320 numbered evenly. By way of non-limiting example, process 300 will be described herein with reference to operations discussed with respect to FIG. 1, above and may be discussed with reference to example system 2800 discussed below.

The background model learning phase or process 300 determines the initial notion of background by analyzing a number of frame differences at the beginning of the scene. Thus, background model learning process 300 may include "determine a learning rate of a scene" 302. This may be performed by the LRC unit 106 by one example, and may include first automatically selecting a learning rate at least between a low rate and a high rate. It will be understood that in other alternatives, there may be additional classifications as well, such as very low, low, medium, high, very high and so forth. This selection is based on spatial and temporal complexity of the scene.

Learning rate is used to set the appropriate frame distances for the given scene depending on the complexity of the scene so that the corresponding frame differences give significant responses. The frame distance is the distance in time counted as a number of frames plus 1, between a current or base frame and a reference frame; this distance is also referred to as pdist (picture distance). By one example, and a future frame maybe used as a reference to compute background-foreground segmentation. In the learning phase, a certain number of reference frames may each be compared to the start or base frame, and the differences between the start frame and each reference frame is used to build the initial model of the background. For different scenes the number of frames in the reference list of frames, and the actual frames used themselves distance may depend on the characteristics of the scene itself. Spatial complexity (SC) is the average complexity of a video frame, and is determined based on amount and level of flat area, edge area, and texture area within a frame. Temporal (or motion) complexity (TC) is the complexity over time from frame to frame. A scene with high temporal complexity may have complex/poorly compensable motion from frame to frame, while a scene with low temporal complexity may have well compensable (often no or little) motion between frame to frame. For slower moving scenes, larger distances are needed to capture sufficiently significant motion to produce the significant motion-based responses that yield successful foreground/ background separation. In this case then, the reference frames are father out from the start or base frame. On the other hand, for faster scenes, smaller distances from the start or base frame to the reference frames are sufficient and more appropriate for the learning of the background model. In the present process, both spatial and temporal complexity is used to determine the learning rate. Also, the reference frames may be any subsequent frame relative to the base frame and that has pixel values that can be differenced with the pixel values of the base frame.

More specifically then, determining the learning rate for a scene may include "determine the complexity of the scene" 304. Spatial complexity (SC) is a quantitative measure of intra-frame complexity in which lower values correspond to scenes with mostly smooth areas, while larger values correspond to scenes with a large number of strong edges and/or texture. By one example, the SC may be the Euclidean norm of the average row-wise squared differences (RS) and the average column-wise squared differences (CS) of two neighboring pixels in a start or base frame in a scene. To reduce computational complexity, the Rs and Cs values may be computed from differences based on a sampling of less than all pixels, such as every other row and/or columns of a frame.

Temporal complexity (TC) is an inter-frame measure which quantifies how much frame values change between the current frame and a reference frame. TC may be set to the average pixel using a sum of absolute difference (SAD) computation between two spaced frames along the scene or video sequence.

Given SC and TC values for the scene, a decision tree (Table 1, FIG. 24A) is used to select the learning rate to either high (faster and/or more complex scenes) or low (slower and/or less complex scenes) to "select reference frames each at a distance from a base frame to the reference frame and along a sequence of frames forming the scene, the selection depending on the complexity of the scene" 306.

The following frame distances correspond to the two learning rates. For high learning rate, assuming the start frame is frame 1, then the process uses five reference frames relatively closer to the start frame at frame distances 2, 4, 8, 16, and 24 frames from the start frame to create a cumulative initial segmentation mask. For low learning rate, the process uses frame distances 24, 32, 40, and 48 frames to create the cumulative initial segmentation mask. Table 1 shows one possible decision tree used in the learning rate computation operation. Table 1 includes measurements from test sequences that can be categorized into best scene classifications (distance for background model) or in other words, to determine the distances to the reference frames. Here, h corresponds to vertical resolution of the frames (in number of lines or rows) being analyzed, SC corresponds to spatial complexity measure, and TC corresponds to temporal complexity measure. Because the spatial and temporal properties of a sequence depend on the frame size, vertical video resolution h is also used in the spatiotemporal decision tree to select the learning rate. In the present example, complexity is determined depending on whether h is greater than 352 pixels for digital versatile disc (DVD) or standard definition (SD) video sequences, or h is less than or equal to 352 for low definition (LD) video sequences as shown.

Figures 24A, 24B:
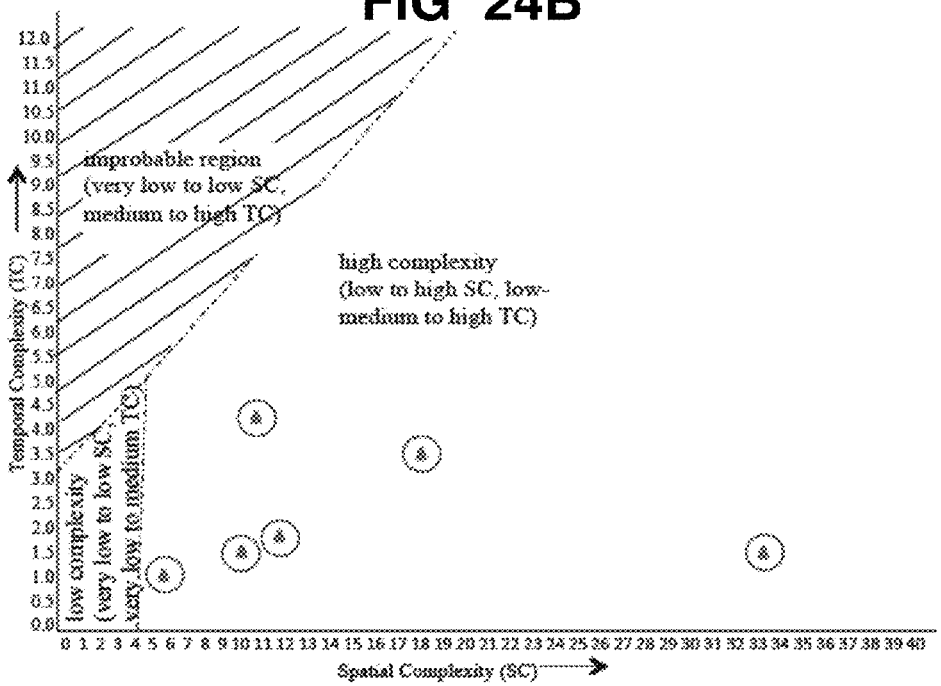
FIG. 24A is a Table 1 of a decision tree used in the learning rate computation operation of the background model learning phase of the background-foreground segmentation process.
FIG. 24B is a chart showing complexity of a frame and used to form Table 1.

Referring to FIG. 24A, the Table 1 decision tree is used in the learning rate computation (LRC) step, and specifically to determine whether a sequence frame based on a combination of spatial and temporal complexity is to be classified into one of two categories, with the first category being high complexity implying faster motion in the scene, and the second category being low complexity, implying smaller motion in the scene. When a scene is classified as belonging to the first category, nearby frames can be used for reference comparison, whereas when a scene is classified as belonging to the second category, farther away frames are needed for reference comparisons.

For example, when there are greater than 352 pixels in a frame, SC is 5.9-6.0 and TC is 0.8 to 0.9, then the frame has high complexity, and the group of frames in the closer distances mentioned above are used. When the SC and TC do not fall within the ranges along the same row in the decision tree, or the frame size is larger than 352 for DVD/SD (smaller than 352 for LD), then the frame has low complexity and the group of frames with greater distances are used. The SC and TC ranges used are determined during experimentation and may not be the only combinations that are effective. Thus, a chart (FIG. 24B) is provided to show the ranges of values that could be effective.

Referring to FIG. 24B, a chart is provided to show the relationship between spatial and temporal complexity and to explain the origins of the ranges from Table 1. Temporal complexity forms the vertical axis and spatial complexity forms the horizontal axis. The chart is divided into three areas. First, an improbable (or impossible) area defined as a combination of very low to low SC plus medium to high TC. Second, the low complexity area (as listed on Table 1) where very low to low SC is combined with very low to medium TC). Third, the high complexity area (as listed on Table 1) combines low to high SC with low-medium to high TC. Each of the circles on the chart shows the range combinations from a row on Table 1, where the edges of the circle roughly correspond to the limits of the recited range. As shown by the chart, many other combinations could be used to classify a frame as high or low complexity.

The process 300 also may include "form a cumulative segmentation mask that indicates activity of pixels or blocks of pixels in at least a portion of the scene" 308. This may be performed by the cumulative initial segmentation computation (CISC) unit 108, and may include "form difference values between the pixel data of the base frame and pixel data of each reference frame" 310. By one example, this may comprise accumulating the frame difference magnitudes in pixel values at a block level, and including an 8×8 block level, although many other partition sizes are possible, and by averaging the pixel values within a block to compute a single value for the block. The frame differences are computed between the first or base frame and each of the selected reference frames as explained above. Then, a magnitude of the energy response at each 8×8 block is calculated.

More specifically, one aim of the cumulative initial segmentation computation is to determine the inter-frame activity levels of 8×8 blocks within a frame. For the given n frame distances $d_1, \ldots, d_n$ to the corresponding reference frames, the cumulative segmentation mask C is computed as the sum of individual 8×8 block-based segmentation masks as follows:

For each reference frame at $d_i$, i=1 . . . n, compute the absolute frame differences $D_i$ which is the pixel value (here luma) differences between the first P luma frame (the start frame (sf)) and the luma frame at distance $d_i$ from the P luma frame. Here, the frame difference is the difference for each pixel location resulting in frame of differences $D_i$. Then, Divide $D_i$ into 8×8 blocks, and set each pixel in $D_i$ to the average value in the 8×8 block to which the pixel belongs. The resulting frame $D_i'$ has smoother noise and stronger and more connected motion areas. In the present example, there would be five $D_i'$, one for each reference frame located by the decision tree (Table 1).

Then, the process 300 may comprise "compare the difference values of the reference frames with a plurality of activity thresholds to determine which pixels or which blocks of pixels are active" 312. Thus, for a given frame $D_i'$, and a given set of m first potential thresholds $t_1, \ldots, t_m$ (which are experimentally determined and set to $t_1, \ldots, t_m = \{1, 2, 3, 4, 5, 6, 8, 12\}$) by one example. These first activity thresholds were obtained by experimentation over a wide range of video sequences and are used as candidates for computing a single unique threshold. The thresholds represent a constraint on absolute value of pixel difference that enables one to classify pixels to belong to the foreground or background group of pixels. In other words, these are initial (or test) background thresholds (or probes). Here, eight thresholds are used but it will be understood that more or less thresholds may be used instead. The final operation may results in binary segmentation mask $S_{i,j}$, j=1 . . . m, as the result of the comparison with the activity thresholds as follows:

$$S_{i,j}(x, y) = \begin{cases} 0, & \text{if } D_i' < t_j \\ 1, & \text{if } D_i' \geq t_j \end{cases} \quad (1)$$

where (x, y) is a block position within a frame. Thus, for the block level segmentation masks $S_{i,j}$, a resulting '0' refers to no or low differences between start and reference frame, and therefore no activity. A resulting '1' refers to larger differences and therefore activity is present. Thus, this equation results in a 0 or 1 for each block in each reference frame (1 to n) and for each threshold (1 to m).

The process 300 may then include "form a plurality of cumulative segmentation masks, each mask being a total of the amount of pixels or blocks of pixels that are active in the same number of combinations of reference frame and activity threshold used to determine the activity of the pixel or block" 314. Specifically, the ones from the binarized blocks are then all totaled to form a cumulative segmentation mask on a per-block basis (or in other words, a total level of "activity" for each block or block position across the combinations). The cumulative segmentation mask C is set to the following sum:

$$C(x, y) = \sum_{\substack{i=1 \ldots n \\ j=1 \ldots m}} S_{i,j}(x, y) \quad (2)$$

where (x, y) represents a single block of pixels (or more accurately a single block position) for each reference frame and for each threshold comparison. In the present case then, C is the total number of combinations (here with a maximum of forty (five reference frames×eight activity thresholds)). Each combination is indicated by binary values (1s) in which the block is active. Thus, by one example, C=10 means a block is active in 10 combinations. There will be as many cumulative segmentation mask C values as the number of combinations plus one for zero (a block that is not active in any combination). The amount of pixels or blocks active in the same number of combinations is then added up to form a final cumulative segmentation mask across all combinations that can be placed in a histogram as shown in FIG. 4.

The process 300 also may include "determine at least one background threshold for the scene" 316, and this may be performed by the adaptive threshold calculation (ATC) unit 110 and includes automatically determining the threshold for splitting the cumulative masks into foreground and background response blocks. The process 300 therefore includes "select, as the background threshold, a minimum cumulative segmentation mask between two maximum cumulative segmentation masks along a numerical ordering of the cumulative segmentation masks" 318. In other words, by one example, the threshold is set to the lowest valley between two peaks in the smoothened histogram of the cumulative mask. The first peak (Peak 1) is set to the histogram point with the largest count. The second peak (Peak 2) is set to the histogram point with the largest count excluding the Peak 1 and its immediate neighborhood (points around Peak 1 which are monotonically decreasing to the left and to the right of the peak). In other words, once the cumulative segmentation mask is obtained, it is used to determine 8×8 block areas which are pertinent to moving objects.

The process 300 also may include "determine the background model with pixel accurate segmentation within blocks" 320. This may be performed by the background model initialization (BMI) unit 112 by one example, and may first include determining the likely background area in the first or base frame. This can then be used to initialize the background model 118. The background area is determined by using the binary cumulative 8×8 mask to find the least error pixel accurate (hole filled) binary frame difference computed from the set of frame distances and thresholds (preset in the first step). In other words, the initial background model is set at the smallest difference, using SAD by one example, between a binarized frame of combination values compared to the background threshold and the binarized difference between the base frame and one of the reference frame-activity threshold combinations. By one example, the combination with the closest reference frame and smallest activity threshold is chosen for comparison.

One example is explained with operation 2254 of process 2200 described below which involves comparing pixel accurate segmentation masks with block accurate segmentation masks.

Thus, to obtain the pixel-accurate segmentation mask (or background model), the following errors are computed using the binarized 8×8 cumulative segmentation mask C':

$$Err_{i,j} = \Sigma abs(C'(x,y) - S_{i,j}(x,y)) \quad (3)$$

where i=1 . . . n, j=1 . . . m. and (x, y) are the coordinates of a block of pixels within a frame. The value 'n' is related to number of frame distances, $d_1, \ldots d_n$ being examined and the value 'm' refers to number of thresholds $T_1, \ldots T_m$ being examined.

Then, distance $d_a$ and threshold $t_b$ of the minimal error $Err_{a,b}$ are used to create the pixel-accurate segmentation mask S. The $d_a$ and $t_b$ values correspond to the case that results in the minimum value of SAD.

By one example, morphological processing may also be applied by first closing and then opening as described below with operation 2256 (FIG. 22b) to fill in holes and otherwise remove noise from the frame.

Finally, the pixel accurate mask S is then used to obtain the initial background model by setting the model to the YUV values of the initial frame only at pixel locations which have 0 value in S. The counter for these pixel locations is set to 1 (meaning that the model contains 1 background value at that pixel location). Counter for other pixels (the ones corresponding to values 1 in the mask S) is set to 0 (meaning that model has no background values at those pixel locations) and the background model for these pixels is unknown. This is shown as the solid white area 702 in FIG. 7.

Figure 5:
FIGS. 5-8 show images illustrating operations in the background model learning phase of a background-foreground segmentation process.
Figure 6:
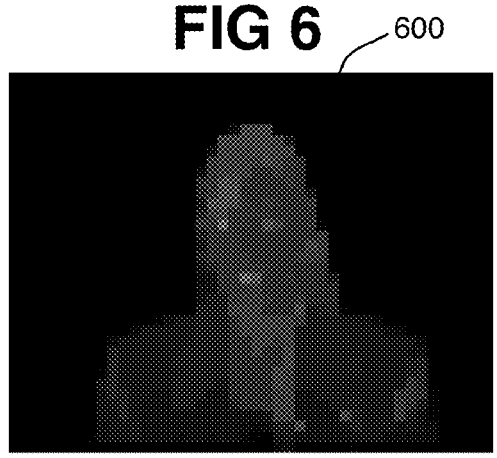
Figure 7:
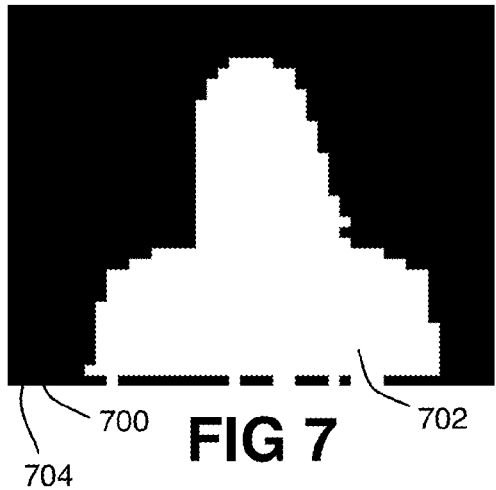
Figure 8:
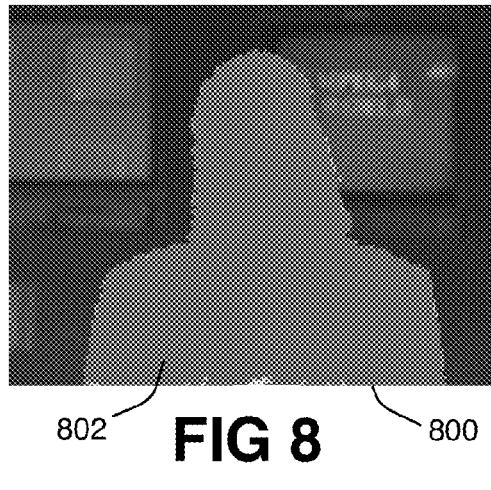

Specifically, and referring to FIGS. 5-8 to illustrate the background learning model process 300, FIG. 5 shows an original frame 500, FIG. 6 shows a cumulative 8×8 mask 600 in gray scale where the scale depends on the number of combinations in which the darker the block, the less active the block. FIG. 7 shows a binary cumulative 8×8 mask 700 after application of the background threshold where the foreground or unknown area 702 is white, and the background 704 is black. FIG. 8 illustrates the initial background model 800 obtained from the binary cumulative 8×8 mask of FIG. 7. The solid gray area 802 in FIG. 8 shows "unknown" background, or in other words what is most likely foreground.

Finally, it will be understood that the background model may be learned separately for each color component (Y, U, and V). This may include taking differences of the relevant pixel values (Y, U, or V) for the calculations. The result, then, actually is three learned background models to be used by the segmentation loop.

Figure 9:
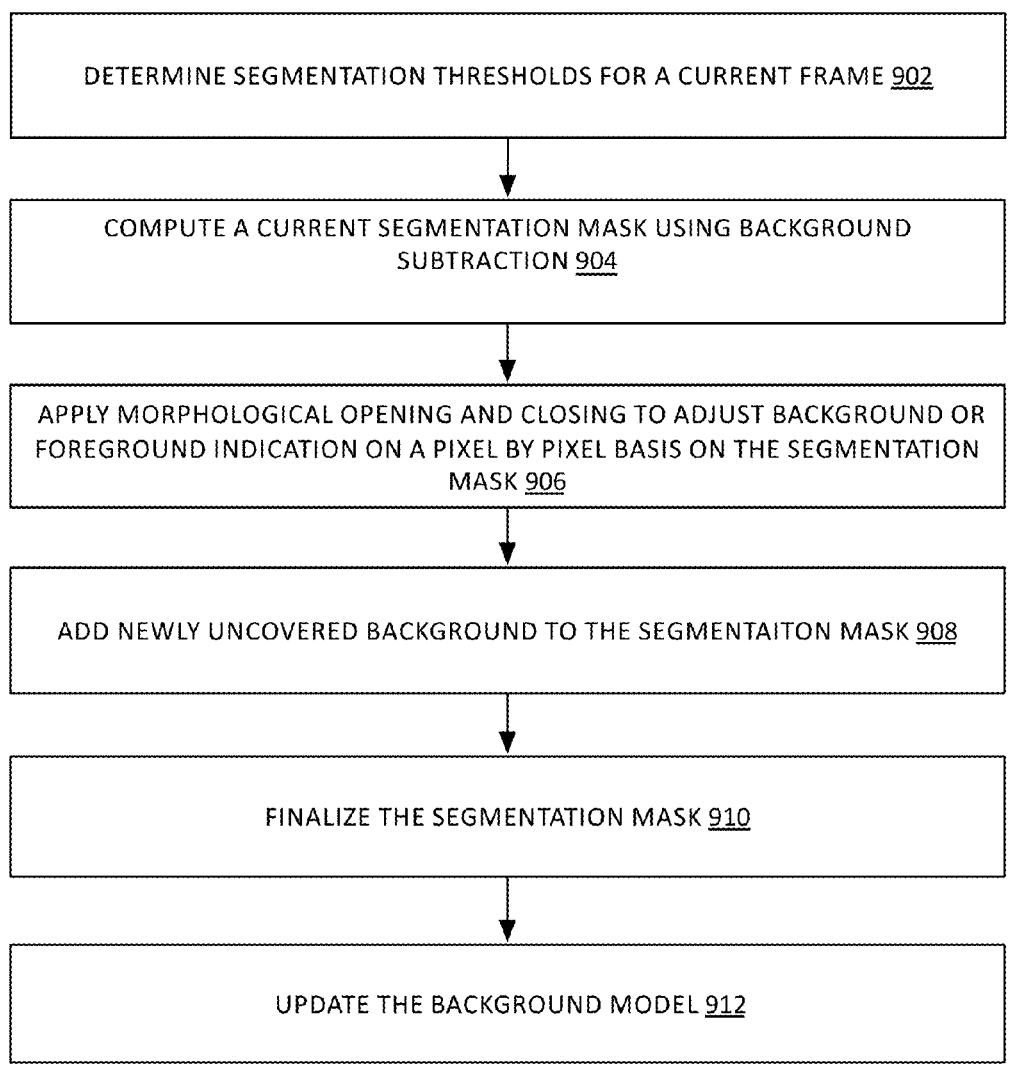
FIG. 9 is a flow chart showing a segmentation loop phase of a process for background-foreground segmentation.

Referring to FIG. 9, a flow chart illustrates an example process 900, arranged in accordance with at least some implementations of the present disclosure. In general, process 900 may provide a computer-implemented method for background-foreground segmentation for video coding including a segmentation loop process or phase. In the illustrated implementation, process 900 may include one or more operations, functions or actions as illustrated by one or more of operations 902 to 912 numbered evenly. By way of non-limiting example, process 900 will be described herein with reference to operations discussed with respect to FIG. 1, above and may be discussed with reference to example system 2700 discussed below.

After the initial background model is established, the segmentation loop phase uses the background model for segmentation of more frames. By one form, a segmentation algorithm loops through all frames to be segmented. In other words, by one example, the segmentation loop uses adjacent frames (in time) to determine the background-foreground threshold. At each iteration, a frame is segmented into foreground/background regions, and the background model is updated for use by the next frame.

More specifically, process 900 may include "determine segmentation threshold for a current frame" 902, which may be performed, by one example, by the adaptive segmentation threshold computation (ASTC) unit 114. This operation includes automatically determining the segmentation threshold for the given or current frame. Since the background model is retained for all three planes (Y, U and V), the segmentation threshold refers to a triple ($T_Y$, $T_U$, $T_V$). The threshold is computed using a linear regression model based on frame size, and the first 25 histogram percentages and the median of absolute frame differences between the current frame and the previous processed frame (which may be immediate previous frame or frame separated by pdist). It will be understood that for at least this operation, the background-foreground threshold here is formed independently of the background model, and to form a segmentation mask that will be revised and then used to update the background model.

By one example, the following equations define a linear regression model used to predict the segmentation threshold for the current frame which is a part of the segmentation loop phase. The following equations are used for the automatic segmentation threshold computation (ASTC) operation:

$$\begin{aligned}Sy = &\ 0.0715*Dy\_med + 0.0442*Cy + 0.0209*Hy_1 - \\ &\ 0.324*Hy_2 + 1.7412*Hy_3 - 1.0499*Hy_4 + \\ &\ 0.7297*Hy_6 + 0.8044*Hy_9 - 0.2698*Hy_{10} - \\ &\ 0.6283*Hy_{11} + 0.8871*Hy_{12} - 1.4504*Hy_{15} + \\ &\ 1.6281*Hy_{16} - 2.3614*Hy_{17} - 2.3476*Hy_{18} + \\ &\ 5.4431*Hy_{19} - 3.5625*Hy_{21} - 2.6202*Hy_{23} + \\ &\ 0.0101*w - 0.0225*h + 6.5227 \end{aligned} \quad (4)$$

$$\begin{aligned}Su = &-0.5912*Du\_med + 0.1567*Cu - 0.1366*Hu_0 - \\ &\ 0.3854*Hu_2 + 1.5786*Hu_4 - 1.9231*Hu_5 + \\ &\ 0.7401*H_7 - 3.9316*Hu_{11} - 2.0961*Hu_{12} + \\ &\ 1.3948*Hu_{14} + 3.2186*Hu_{15} - 1.4141*Hu_{17} - \\ &\ 2.3575*Hu_{18} + 1.7657*Hu_{20} - 1.2332*Hu_{21} - \\ &\ 3.0928*Hu_{22} + 6.6386*Hu_{24} - 0.0015*w + 14.656 \end{aligned} \quad (5)$$

$$\begin{aligned}Sv = &-0.7941*Dv\_med + 0.0248*Hv_1 + 0.0741*Hv_2 + \\ &\ 0.7821*Hv_4 + 1.429*Hv_8 + 1.6046*Hv_{10} + \\ &\ 1.4576*Hv_{11} + 2.2069*Hv_{12} - 5.8848*Hv_{15} - \\ &\ 1.9043*Hv_{16} + 2.8021*Hv_{17} + 2.9689*Hv_{18} - \\ &\ 3.8078*Hv_{21} + 2.3297*Hv_{22} + 1.6067*Hv_{23} - \\ &\ 0.001*w + 4.2531 \end{aligned} \quad (6)$$

where Dy_med, Du_med, and Dv_med are the median value from the absolute difference histogram of color component (Y, U, or V) between two adjacent processed frames (they can be neighboring frames or frames that are pdist apart) as explained, Cu and Cy are the number of significant absolute difference histogram points of color component U or Y whose value falls in the 99.9-th percentile between two adjacent processed frames (they can be neighboring frames or frames that are pdist apart), and $Hy_n$, $Hu_n$, $Hv_n$ are the n-th absolute difference histogram point of the color component Y, U, or V and between two adjacent processed frames (they can be neighboring frames or frames that are pdist apart).

The final set of thresholds Ty, Tu, and Tv are computed as follows:

$$Ty = \text{CLIP}(Sy, 3, 16); \quad (7)$$

$$Tu = \text{CLIP}(Su, 3, 12); \quad (8)$$

$$Tv = \text{CLIP}(Sv, 3, 12), \quad (9)$$

where

-continued $$\text{CLIP}(X, m, n) = \begin{cases} m, & \text{if } X < m; \\ n, & \text{if } X > n; \\ X, & \text{otherwise} \end{cases} \quad (10)$$

and where the thresholds Ty, Tu, and Tv are difference magnitudes to be compared to the differences between the pixel values in a current frame and the background model (whether an initial learned background model or the most up-to-date background model) as described below. The fixed values of 3, 12, and 16 were obtained by trial and error.

The segmentation threshold is then used to create a binary segmentation mask by applying a threshold to the absolute frame difference between the current frame and the background model. Thus, process 900 also may include "form a current segmentation mask using background subtraction and the background model" 904. This includes the use of background subtraction (BS) to compute a raw segmentation mask by binarizing the absolute frame difference between the current frame and background model using the threshold computed in the previous operation. This background subtraction operation first computes the D absolute frame difference between the current picture frame and the initial background model or the latest updated background model for all three color planes, Y, U and V. Then, a raw segmentation mask S is obtained as follows:

$$S(x, y) = \begin{cases} 0, & \text{if } D_Y(x, y) < T_Y \text{ and } D_U(x, y) \text{ and } D_V(x, y) < T_V, \\ 1, & \text{otherwise} \end{cases} \quad (11)$$

where (x, y) is a pixel value, block of pixels, or some other partition size in the segmentation mask, and where 0 indicates background while 1 indicates foreground.

Process 900 also may include "apply morphological opening and closing to adjust background or foreground indication on a pixel by pixel basis on the segmentation mask" 906, and by one example, performed by the MOC unit 120. The morphological opening and closing are applied to the raw segmentation mask to delete random pixel noise as well as to create a better connectivity within the segmented foreground objects. Morphological opening and closing is applied to the raw segmentation mask as an initial simple noise filtering that removes segmentation noise pixel formations and closes short openings between segmented lines resulting in continuous, cleaner segmentation mask. Morphological close (dilation followed by erosion) is applied first to strengthen the connectivity of foreground objects, and then morphological open (erosion followed by dilation) is applied to remove the initial background noise. The morphological support region is set to a 2×2 square:

A B
C D where both dilation and erosion use the 2×2 support region as 2×2 sliding window that is applied pixel-by-pixel on the binary segmentation mask, in a raster scan manner from top left hand corner to bottom right hand corner of the frame. This operation updates the top left value according to the three neighboring pixels in the square. In a 2×2 dilation square, a dilation bit A is set to 1 if any of B, C or D is 1. On the other hand, in a 2×2 erosion square, an erosion bit A is set to 0 if any of B, C or D is 0. The process of dilation, fills holes creating longer continuous line segmentation boundaries, while the process of erosion, deletes noise formations on otherwise non-abruptly-varying segmentation boundaries. The overall combined process converts additional pixels into foreground pixels in the area where majority of pixels are foreground pixels, and vice versa.

Process 900 also may include "add newly uncovered background to the segmentation mask" 908 also referred to as unknown background uncovering (UBU). This operation may be performed by the UBU unit 124 by one example. This operation may be used when the foreground moves and uncovers pixel locations that are to be made part of the background. Specifically, the initial model often contains areas which were never uncovered and included in the foreground (see FIG. 8). This operation uses advanced spatiotemporal analysis around the current object borders to determine if the large frame differences are caused by foreground or newly uncovered background.

Figure 10:
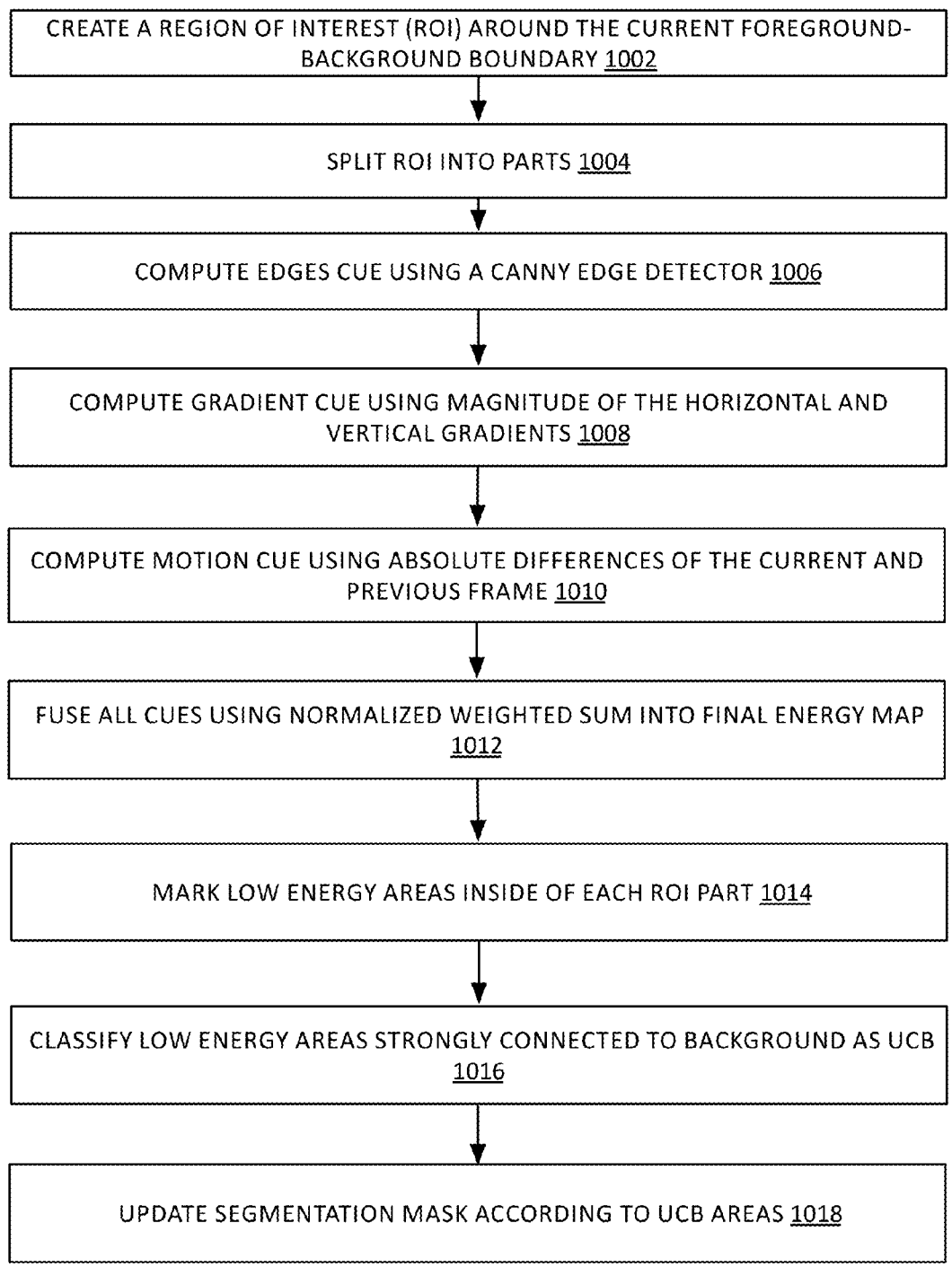
FIG. 10 is a flow chart showing a process to update a background-foreground segmentation with uncovered current background areas.

Thus, referring to FIG. 10, this UBU operation of process 900 may include a process 1000 to add newly uncovered background to the background model and that comprises one or more operations, functions or actions as illustrated by one or more of operations 1002 to 1018 numbered evenly.

Figure 11:
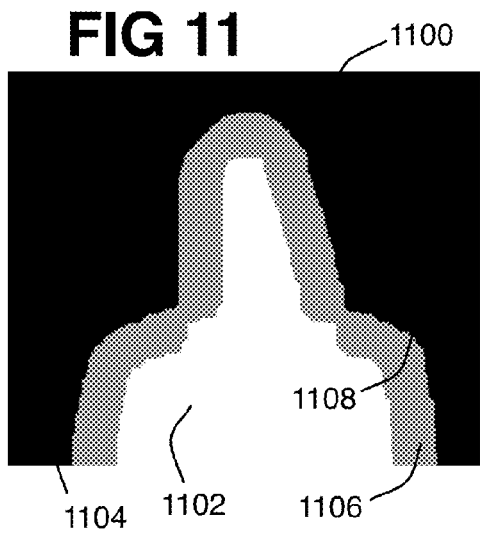
FIGS. 11-12 show images illustrating ROI marking operations in the segmentation loop phase of a background-foreground segmentation process.

Referring to FIG. 11, the process 1000 includes "create a region of interest (ROI) around the current foreground-background boundary" 1002. Thus, a frame or segmentation mask 1100 has a foreground 1102, a background 1104, and a test region of interest (ROI) 1106 that is marked around the foreground objects in the current segmentation mask. Specifically, the test ROI 1106 extends around a border 1108 between the background and foreground areas 1102 and 1104 set by the threshold so far. By one example, the test ROI 1106 extends inward from the border 1108 including pixels or blocks that may be uncovered when the foreground moves, and are not yet part of the background model. The thickness of the test ROI 1106 is set based on the frame size or resolution. This may be a percentage of the resolution such as the height, width, or total number of pixels in the frame. Otherwise, the thickness may be a percentage of either the total foreground or background pixels so far. Instead, this may be a percentage of the total number of pixels in the frame or segmentation mask.

Figure 12:
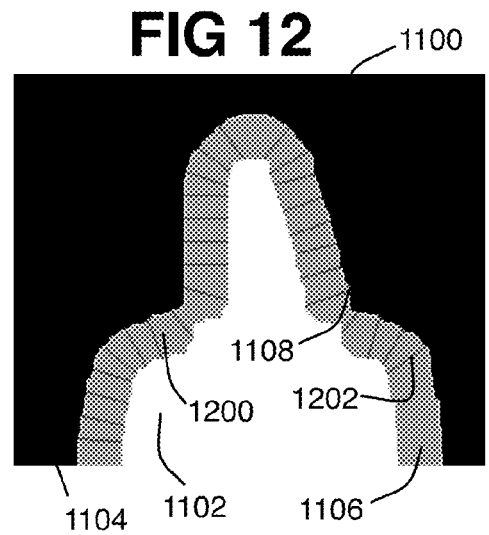

Referring to FIG. 12, the process 1000 includes "split ROI into parts" 1004. Once an ROI is marked, it is partitioned using line segments perpendicular to the ROI's outer contour. This includes using line segments 1202 perpendicular to the ROI outer contour or border 1108 to divide the ROI into parts or partitions 1200. In one form, the number of ROI parts depends on the contour size, and the line segments are drawn at a fixed distance from each other (and the distance also may be preset based on frame size). The goal of this process is to reduce long segments to piece-wise smaller segments that can be more easily evaluated, narrowing the area where a potential error may be made. By splitting ROI 1106 into smaller partitions 1200, the spatiotemporal analysis is more localized and eliminates error propagations (for example, large falsely declared background areas).

Referring to FIG. 25, Table 2 provides segmentation settings, and specifically ROI sizes, that were determined by experimentation using trial and error. The dimensions of the ROI depend, by one example, on the picture height (height of the frame) h as shown on Table 2, and in one example, whether the height of the frame is high definition (HD) or larger (h is more than 1080 pixels). The ROI segment length dividing adjacent ROI parts 1200 is 16 or 24 pixels, the inner width of the ROI (along the inner edge of the ROI) is either 26 or 42 pixels, while the outer width of the ROI (along the edge with the background area) is either 6 or 16 pixels, where the larger dimension is used when h is greater than 1080. The process is the equivalent of taking a contour and squeezing it until it fits inside the object.

Figure 13:
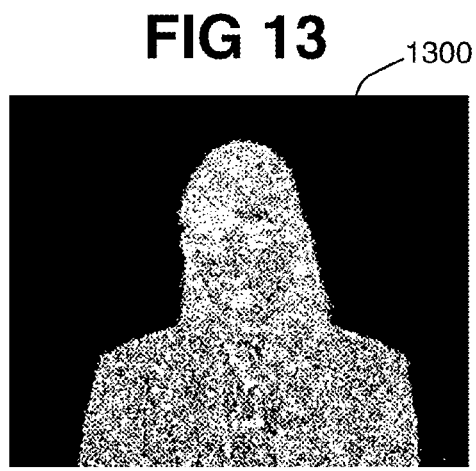
FIGS. 13-16 show images illustrating spatiotemporal cue operations in the segmentation loop phase of a background-foreground segmentation process.
Figure 14:
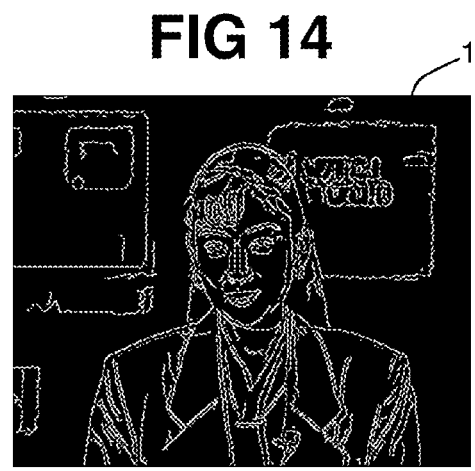
Figure 15:
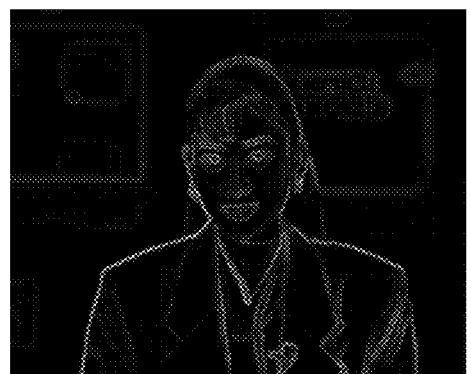
Figure 16:
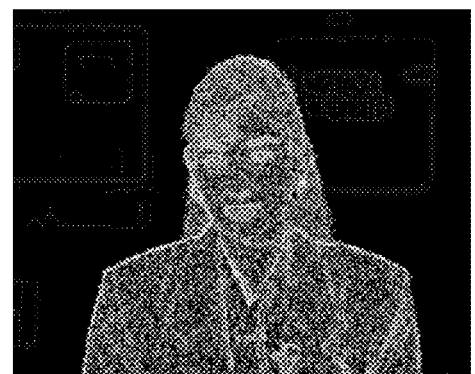

Referring to FIGS. 13-15, after the ROI partitions 1200 are created, three different cues are used for spatiotemporal analysis of the ROI to "determine whether a low energy area exists within the ROI that is likely to be uncovered background parts" 1005. By one example operation to determine low energy areas, the process 1000 may include using edge detection, motion detection, and gradient (of the relevant Y, U, V color component) detection to determine the low energy areas. This may comprise "compute edge cues using a Canny edge detector" 1006. Using such a Canny edge detector, edge cues $E_c$ may be formed for all relevant pixels in a frame, and as shown on frame 1400 (FIG. 14) (frame 1400 shows the $E_c$ formed for all pixels). This may be performed for each frame after the start frame that is being analyzed, and may be performed for each pixel in the ROI in the frame.

Also, process 1000 may then include "compute gradient cue using magnitude of the horizontal and vertical gradients" 1008. In this operation, a gradient cue $G_c$ may be formed for at least individual relevant pixels if not the entire frame, and using a magnitude of the horizontal and vertical gradients in the luma (Y) component computed as a byproduct of canny edge detection. The gradients are shown for an entire frame 1500 (FIG. 15).

Also, process 1000 may then include "compute motion cue using absolute differences of the current and previous frame" 1010. This operation forms a motion cue $M_c$ using absolute differences of the current (or base) and a previous frame (pdist away for example), and as shown in frame 1300 (FIG. 13). This may be performed on a pixel-by-pixel basis.

Once the cues are established, the process 1000 may include "fuse cues into an energy map" 1012, and by one example, a final energy map using normalized weighted sums. The cues are used to create the final energy map as follows:

$$E = 0.1 E_c + 0.4 G_c + 0.5 M_c \quad (12)$$

where E is the total energy of a pixel (or other unit used). The energy map provides a map of varying level of activity, and in one case on a pixel by pixel basis, so that low energy areas that are likely to be background are revealed.

The process 1000 may then comprise "mark low energy areas inside of each ROI part" 1014, and then "classify low energy areas strongly connected to background as uncovered current background (UCB)" 1016. Thus, the low energy areas within each ROI part are marked as potentially newly uncovered background. The circumference, size, and shape of the marked area are then examined to determine the degree of connectivity of the marked area with the background. If (a) at least $1/8^{th}$ of the length of the area circumference is connected to the background, (b) the size of the area is at least 16 pixels, and (c) the shape complexity is low, then the area is marked as uncovered background. The given shape is declared complex if shape circumference is greater than $1/8^{th}$ of the shape area. Referring to FIG. 17, a frame 1700 is formed with a final uncovered background area 1702 (marked as gray area just outside and along the white edge of the foreground) computed inside ROI parts 1704 using the cue-fused energy map. The process 1000 may then include "update segmentation mask according to the uncovered current background (UCB) areas" 1018, and by adding these areas as part of the background.

The process 900 also may include "finalize the segmentation mask" 910 by removing noise-like objects as well as by filling some small holes contained within foreground. This may be performed by the segmentation mask noise removal (SMNR) unit 124 by one example. Segmentation mask noise removal includes smoothing of the segmentation mask by deleting 2-pel wide scan lines scanned both horizontally and vertically, removing small isolated regions and background areas fully contained within the foreground, and smoothing the sharp edges of the mask. Table 3 (FIG. 26) shows settings for cleaning of the segmentation mask by smoothing the foreground object contour and deleting small noise-like spikes and blobs. Both settings are based on input video resolution (where w=frame width, and h=frame height). Depending on the frame size (in pixel resolution by one example), the minimum object size is set as well as the smoothing binary filter length as shown on table 3.

Process 900 also may include "update the current background model" 912. Particularly, this operation uses the current segmentation mask to update the current background model. The background model is updated by adding the background pixels of the current segmentation mask to the existing model and creating a running average. This operation may be performed by the background model update (BMU) unit 126 by one example.

Once the segmentation mask is finalized, the segmentation mask may be provided to an encoder (or from a pre-processing portion to a processing portion of an encoder). Then, as mentioned above with system 150 (FIG. 31), the encoder may use the segmentation mask to modify the quantization parameters. The qp may be increased to decrease precision and quality for a background, and the qp may be reduced to increase quality and precision for the foreground. The qp's are then transmitted to a decoder for reconstructing the image. The segmentation mask is not transmitted to the decoder in this case, which saves bandwidth.

It will be appreciated that other alternatives exist when desirable. Thus, for example the qp may be adjusted to decrease the image quality of the foreground relative to the background or to decrease the image quality of a portion of the foreground relative to other portions of the foreground and/or background. Likewise, the qp may be adjusted to increase the image quality of the background relative to the foreground or a portion of the background relative to other areas of the background and/or the foreground.

With regard to the object oriented coding as mentioned with system 160 (FIG. 32), the background model learning process 300 and segmentation loop process 900 are similar, except that here, the segmentation mask is a segmentation map of the detected objects, and the processes 300 and 900 may effectively treat each detected foreground object as an ROI, such that each foreground object may be fine-tuned in the segmentation loop individually for the morphological, uncovering background, and finalizing operations 906, 908, and 910. By one approach, however, the individual objects are grouped together and considered a single foreground or foreground object while the background is considered a background object so that there are only two objects in the segmentation map. By one form, the segmentation map is a map of at least one foreground object and at least one background object.

Referring to FIGS. 18-21, example of a segmentation loop phase is provided, where a current frame 1800 includes both background and foreground areas. The corresponding current background model 1900 is shown in its entirety with the foreground areas removed. A raw segmentation mask 2000 is formed after background subtraction with the removed foreground areas in white and the background in black. A final segmentation mask 2100 is formed after morphological operators, unknown background uncovering, and the final segmentation noise removal. In this case, it is noted that the basketball net is removed from the segmentation mask 2100 since it is moving and is therefore considered foreground.

Figure 23:
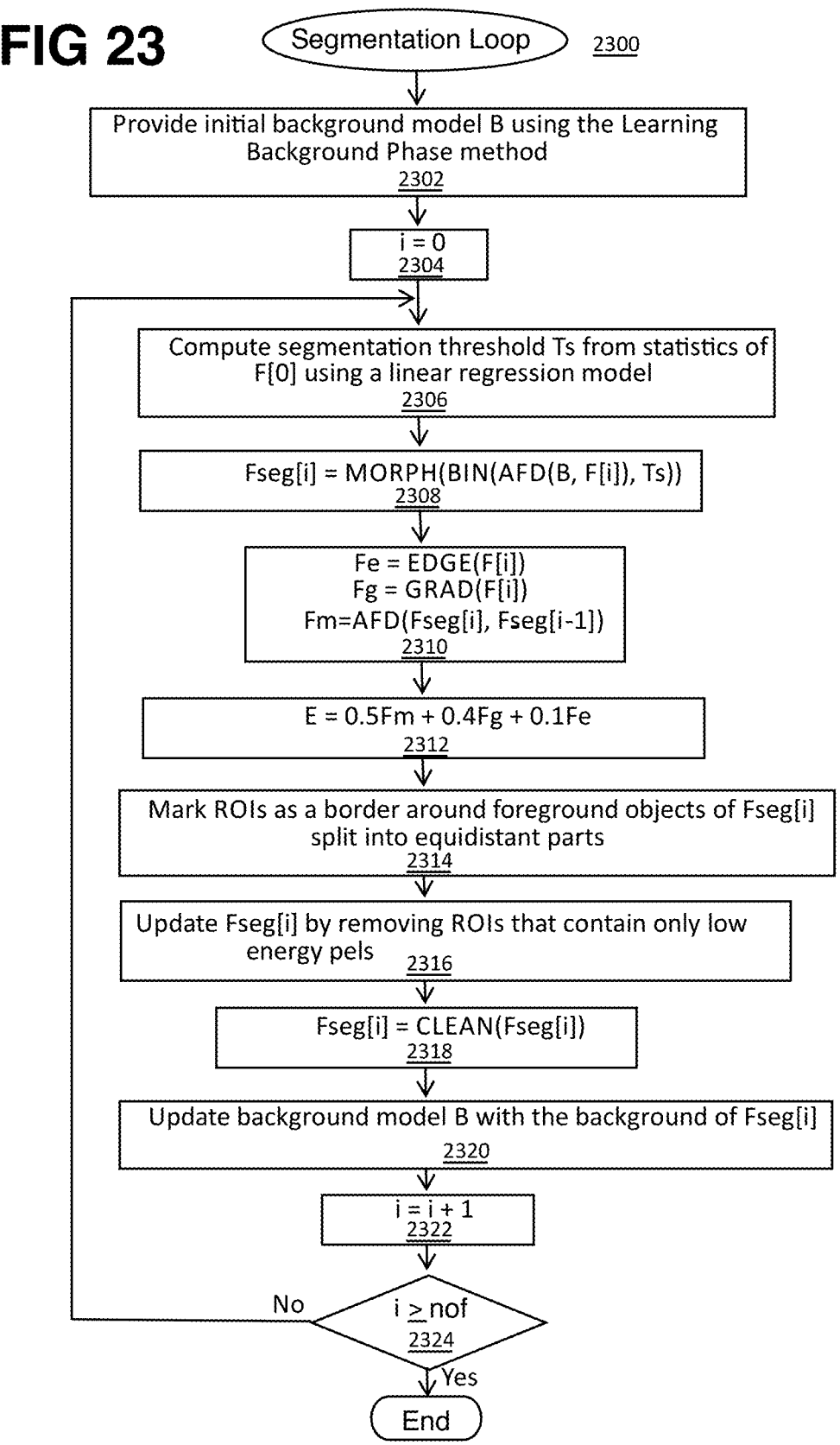
FIG. 23 is a detailed flow chart for the segmentation loop phase of a background-foreground separation process.

Referring to FIGS. 22A-22B and 23, processes 2200 and 2300 show more details of the operations that may be used to perform the segmentation processes described herein. Process 2200 describes the background model learning process, while the process 2300 describes the segmentation loop process. The following notation is used within the flowcharts to explain processes 2200 and/or 2300.

TABLE 4

Terms used on segmentation system flow charts in order of appearance on the charts (FIGS. 22-23).

| Notation | Description |
|---|---|
| sf | Start (or base or current) frame |
| pd | The distance between pictures (or frames) along a sequence of frames in a video. |
| TC(X, n) | Temporal complexity of picture X compared to picture at distance n of X |
| F[n] | Luma frame or picture of the n-th frame of the input sequence |
| Fu[n], Fv[n] | U and V chroma frames or pictures of the n-th frame of the input sequence |
| Td | Threshold for scene dynamics in respect to temporal complexity (set to 8.0 at current implementation) |
| stat | Statistic that indicates temporal complexity |
| sdyn | Statistic that indicates scene dynamics |
| CMPLX(X, a, b, c) | Classification of the complexity of the scene at picture X using its spatial complexity a, temporal complexity b, and vertical resolution c (0 = low complexity, 1 = high complexity) |
| SC(X) | Spatial complexity measure of picture X |
| h | Frame height |
| nd | Total number of distances from the start frame (and in turn the total number of reference frames) |
| d | Distance from the start frame to the reference frame |
| Fo | An initial frame or frame buffer holding the number of combinations in which each block or pixel is active |
| nt | Total number of activity thresholds |
| t | Activity threshold value |
| Ft | A frame of differences between the start frame and a reference frame at distance d and to be compared to activity threshold t |
| AFD(X, Y) | Absolute frame difference of pictures X and Y |
| BIN(X, t) | Picture or frame X binarized with activity threshold t (values less than t are set to 0, and values greater or equal to t are set to 1) |
| CLEAN(X) | Remove small foreground and background objects with a flood-fill algorithm |
| Fs | Cleaned and binarized frame with values that indicate activity resulting from a comparison with activity threshold t |
| B[k] | Block k of a frame |
| HIST(X) | Histogram of frame X |
| p | $1^{st}$ peak in a histogram (or a single number of activity combinations in which a $1^{st}$ maximum amount of blocks or pixels are active in) |
| q | $2^{nd}$ peak in a histogram (or a single number of activity combinations in which a $2^{nd}$ maximum amount of blocks or pixels are active in) |
| Ta | Background threshold indicated at a minimum amount of pixels/blocks for a number of active combinations between $1^{st}$ and $2^{nd}$ maximums (or peaks) |
| t_min | A minimum complexity threshold |
| d_min | A minimum distance from a start frame to a reference frame along a video sequence |
| SAD | Sum of Absolute Differences—finding the absolute difference between values of corresponding pixel or block values in two frames with corresponding block or pixel locations |
| MORPH(X) | Morphological closing (dilation followed by erosion) followed by morphological opening (erosion followed by dilation) with a 2 × 2 square support region |
| B | Background Model |
| Ts | Segmentation threshold for frames after the start frame |
| Fseg[i] | Frame current segmentation mask |
| Fe | Frame edge energy (also edge cue $E_c$) |
| EDGE(X) | Weighted Canny edge picture derived from X normalized between 0 and 1 |
| Fg | Framegradient energy (also gradient cue $G_c$ above) |
| GRAD(X) | Gradient picture derived from X normalized between 0 and 1 |
| Fm | Frame motion energy (also motion cue $M_c$ above) |
| E | Total energy of a pixel (or other portion) of a frame |
| w | Frame width |
| nof | Number of frames in the input sequence |

Example background model learning process 2200 is arranged in accordance with at least some implementations of the present disclosure. In general, process 2200 provides procedures and/or algorithms that may be used in a computer-implemented method for background-foreground segmentation for video coding including a phase for learning a background model. In the illustrated implementation, process 2200 may include one or more operations, functions or actions as illustrated by one or more of operations 2202 to 2256 numbered evenly. By way of non-limiting example, process 2200 will be described herein with reference to operations discussed with respect to FIG. 1 above, example system 2800 discussed below, or any other implementation discussed herein.

Process 2200 may include determining whether temporal complexity TC is greater than a complexity threshold, and specifically a scene dynamic threshold Td in operations 2202-2212. To obtain the temporal complexity, the base or start frame pixel values are compared to the next frame (which may be separated by pdist) using SAD, and may be averaged. If it is, then a statistic stat is set at 1; if it is not, the stat is set at 0. Then, for TC, F[sf] current frame is compared to F[sf+pd*4] where pd is the pdistance between the pair of frames for which segmentation mask is being computed (such that ref frames list uses frames that are distance 4 apart) and spatial and temporal complexity may be calculated as described above, and the overall complexity depends on a combination of spatial and temporal complexities, as well as potentially other factors such as vertical resolution of a frame. Then, total complexity C may be determined as explained above, and with design tree shown in table 1 (FIG. 24A).

If a scene is determined to be of low complexity 2216, C=0 and a lower number of references at different distances d from the base frame (sf) may be used. The distances d are at least generally farther distances relative to that used for high complexity. As explained above, the number of reference frames (distances) nd=4, and at d=[24, 32, 40, and 48], and are 'farther references' by one possible example operation 2220. If high complexity is found, C=1 and nd=5, and distances d=[2, 4, 8, 16, 24] are used for example 2218 and are the 'closer' reference frames. As mentioned above, the number of reference frames and the distances to the reference frames may be different.

Then, the process 2200 includes "initialize frame buffer Fo to 0" 2222, for eight activity thresholds (nt) at the eight values of t shown (1, 2, 3, 4, 5, 6, 8, 12 by one example), and a counter i is set to 0 where counter i counts the reference frames to set which reference frame is the reference frame being compared to the activity thresholds t. The process 2200 then includes "set each 8×8 block of Ft to the corresponding average 8×8 block value of AFD(F[sf], F[sf+d[i]])" 2224. Thus for a frame of differences Ft between the start frame and each reference frame being compared to a threshold t, Ft includes the average difference value of each block, by one example. Alternatively, each pixel in the block may be set to the average value within the block.

Then, process 2200 may include setting 2226 a counter j to 0 for counting the thresholds t that are compared to each reference frame at distances d. Process 2200 may then include setting a binary frame to "Clean(BIN(Ft, t[j]))" 2228 to provide binary values for each block and for each comparison to an activity threshold t. The frame of binary values are cleaned where small objects are removed according to flood-fill algorithms. A block counter k is set to 0 in operation 2230, and a bock B[k] being analyzed is set as the k-th block of frame Fs in operation 2232. It is then determined 2234 whether B[k]=1 (or in other words, whether all the pixel values in the block are 1). If yes, the process 2200 includes "add one to all pixels of k-th block of Fo buffer" 2236 in order to maintain a count of which blocks (or pixels) are active in which number of combinations of reference frame (also referred to as distance d) and activity threshold t. As explained above, with 5 reference frames and 8 activity thresholds, there are 40 possible combinations. Buffer Fo keeps track of how many blocks are active in 0 to 40 combinations. For example, a block could be active in 10 combinations, or 32 combinations, to name a few examples. Fo will maintain a count to determine how many blocks (or pixels) are active in the 10 combinations or 32 combinations across all references and thresholds t. These totals will become the cumulative segmentation masks.

The process 2200 then continues with adding one to the block count k to analyze the next block (2238). Alternatively, if the block B[k] has a 0 at operation 2236, then it is not active, and the process does not add to the buffer count and proceeds directly to the next block (2238). It is then determined 2240 whether B[k] is the last block. If not, the process loops to analyze the next block. If so, the process continues by adding one to the activity threshold count to compare the difference between the base frame (sf) and reference frame (sf+d[i]) to the next activity threshold t (2242). Thus, it is determined 2244 whether j≥nt (the last activity threshold t). If not, the process loops back to form a frame Fs and perform analysis with the next activity threshold t. If so, the process 2200 continues by adding one to the reference frame count i (2246) to analyze comparisons with the next reference frame at d[i]. It is first determined whether i≥nd (the last reference frame distance) 2248. If not, the process loops back to the formation of Ft to perform the analysis with the next reference frame. If so, the process 2200 continues to determine the background threshold.

By the illustrated example, and as explained previously, process 2200 may use a histogram of the total values (or cumulative segmentation masks) in buffer Fo. Thus, process 2200 may continue with "p=$1^{st}$ max peak in HIST(Fo) and q=$2^{nd}$ max peak in HIST(Fo)" 2250 and then "Ta=min value HIST(Fo) between p and q" 2252. By one example, the $2^{nd}$ peak cannot be adjacent to, or within some other distance from, the $1^{st}$ peak. Ta is the background threshold set at the minimum or valley cumulative segmentation mask value or total between the peaks or maximums, as explained above with the histogram of FIG. 4.

Then, in order to build the initial background model, the process 2200 may continue with "find t_min from set t, and d_min from set d for which BIN(Fo, Ta) and BIN(AFD(F [sf], F[sf+d_min]), t_min), has the smallest sum of absolute difference (SAD) error" 2254. Thus, this operation provides a binarized segmentation frame or map from the buffer Fo and using the background threshold Ta (so that 0 is background and 1 is foreground for example), and compares this segmentation mask to a binarized segmentation mask formed by comparing the difference between the base frame and a reference frame to an activity threshold t. By one form, the reference frames and activity threshold is tested starting with the lowest value and working through the sets to the largest values. The closest (least difference or SAD) combination is set as the initial background model. When the background model so far is based on a block-accuracy, the background model may be converted to a pixel accurate segmentation mask by determining a minimum error as explained above with process 300.

By one approach, the process 2200 also may include a morphology operation to clean up the initial background model. This may include morphological closing (dilation followed by erosion) followed by morphological opening (erosion followed by dilation) with a 2×2 square support region as described above with process 900. Once complete the initial background model may be provided to the segmentation loop unit 104.

Example segmentation loop process 2300 is arranged in accordance with at least some implementations of the present disclosure. In general, process 2300 provides algorithms that may be used in a computer-implemented method for background-foreground segmentation for video coding including a segmentation loop phase for providing a background model for a number of frames in a sequence. In the illustrated implementation, process 2300 may include one or more operations, functions or actions as illustrated by one or more of operations 2302 to 2324 numbered evenly. By way of non-limiting example, process 2300 will be described herein with reference to operations discussed with respect to FIG. 1 above, example system 2800 discussed below, or any other implementation discussed herein.

Process 2300 may include "provide initial background model B using the learning background phase method" 2302 and as described above. The process may use background models that are provided by other processes as well. Process 2300 than may include setting a counter i to 0 (operation 2304) to count the number of frames in an input sequence that are being analyzed. 'i' here is different from the counter i used in process 2200 to indicate which reference frame was being analyzed. Process 2300 then may include "compute segmentation threshold Ts from statistics of F[0] using a linear aggression model" 2306. As explained above, three models may be formed, one for each color component (Y, U, V), and may be based on differences between a pair of frames (separated by a pdist(ance)) in the sequence, separate from the initial background model.

Process 2300 may then include background subtraction by subtracting the initial background model from the current frame, and comparing the difference to the frame threshold Ts by binarizing the result. The process 2300 may then include applying morphology (operation 2308) to the resulting binary frame, or current segmentation mask, and in the same way as described above for processes 300 and 900, to clean up the frame.

Once this is complete, process 2300 may include adding newly uncovered background to the current segmentation mask. This includes determining which areas of a region of interest (ROI) are low energy areas that are likely background. Thus, process 2300 may include determining 2310 Fe edge energy, Fg gradient energy where gradient is computed for the luma/brightness (Y) component for the background being developed, and Fm motion energy, all three of which are described above (although as cues Ec, Gc, and Mc). The energies are fused 2312 into a total energy E in a weighted formula:

$$E = 0.5Fm + 0.4Fg + 0.1Fe \quad (13)$$

by one example 2312 (and same as equation (12) above). The ROI is formed by an operation to "mark ROIs as a border around foreground object of Fseg[i] split into equidistant parts." 2314. The distance may be resolution dependent as explained above. Then, "update Fseg[i] by removing ROIs that contain low energy pels" 2316, and in one case, pels smaller than approximately delta=0.035, and by other examples pels smaller than delta=0.03 or delta=0.04, or other values.

The process 2300 may then include finalizing the current segmentation mask such as by cleaning it to remove small objects (2318). This may be performed by well known processes described as flood-filling. Then, the process 2300 may "update the background model B with the background of Fseg[i]" 2320, and as described above with process 900. The counter i may then be incremented by 1 (operation 2322), and a determination may be made as to whether i=number of frames (nof), or in other words, is the last frame in the input sequence 2324. If not, the process loops back to determine a new threshold Ts for the current frame i, and if so, the process is ended and the updated background model is provided for further coding of the video sequence. The process is restarted with forming an initial background model when a new input sequence is presented.

Figure 27:
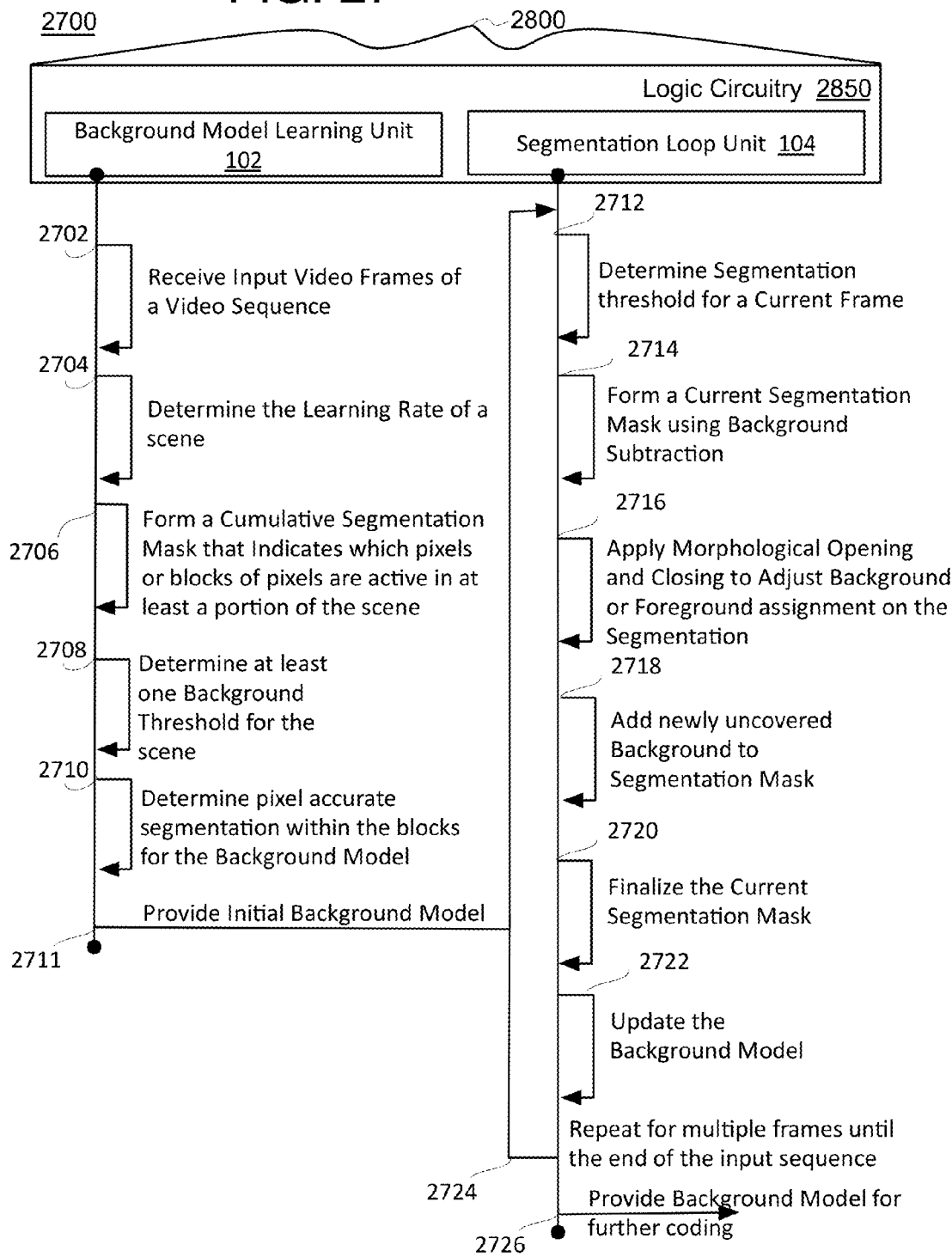
FIG. 27 is an illustrative diagram of an example system in operation for providing a background-foreground segmentation process.

Referring now to FIG. 27, system 2800 may be used for an example background-foreground segmentation process 2700 shown in operation, and arranged in accordance with at least some implementations of the present disclosure. In the illustrated implementation, process 2700 may include one or more operations, functions, or actions as illustrated by one or more of actions 2702 to 2726 numbered evenly, and used alternatively or in any combination. By way of non-limiting example, process 2700 will be described herein with reference to operations discussed with respect to any of the implementations described herein.

Figure 28:
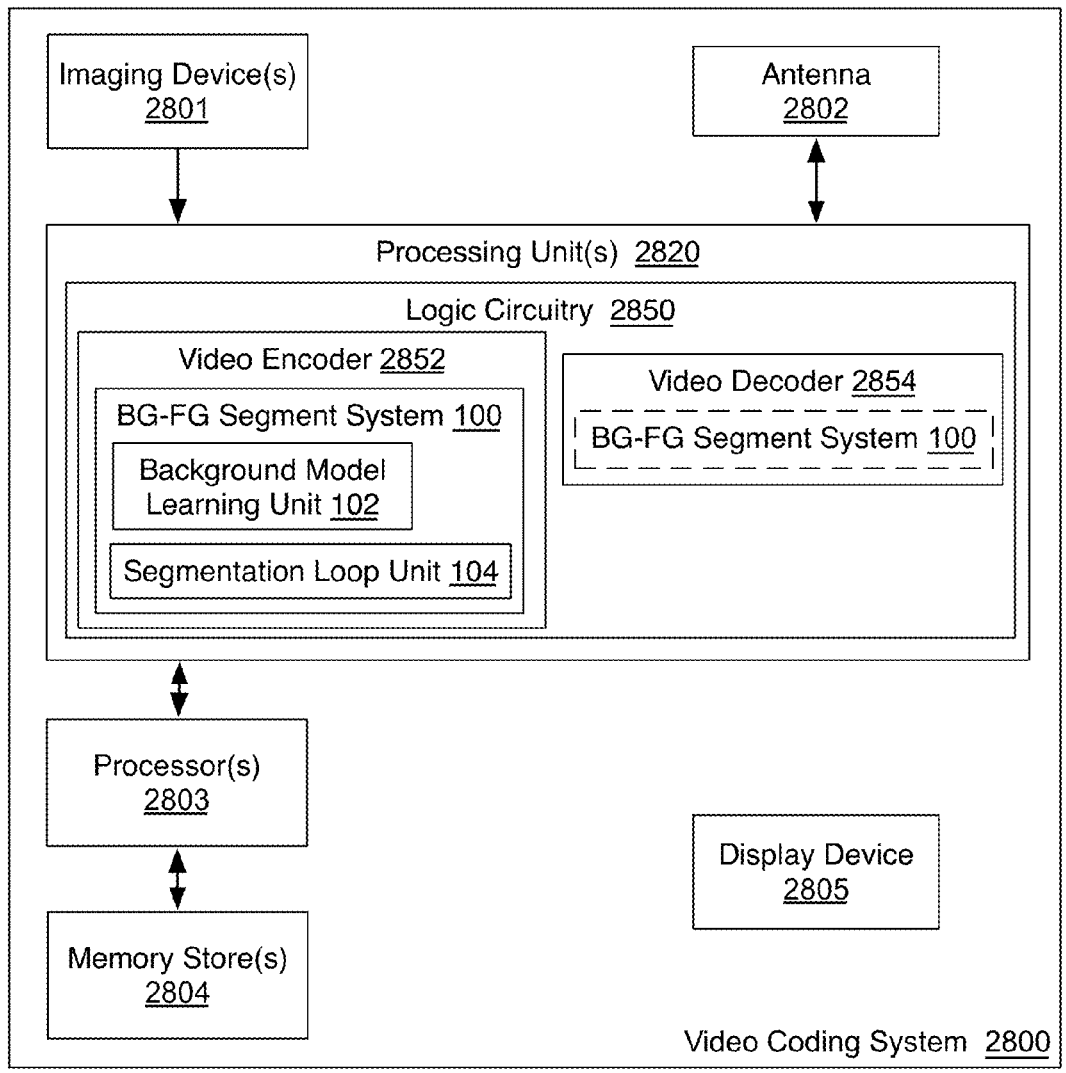
FIG. 28 is an illustrative diagram of an example system.

In the illustrated implementation, system 2800 may include a processing unit 2820 with logic units or logic circuitry or modules 2850, the like, and/or combinations thereof. For one example, logic circuitry or modules 2850 may include a video encoder 2852 and/or a video decoder 2854. Either the coder 2852 or 2854 or both may include the segmentation system 100 with the background model learning unit 102 and the segmentation loop unit 104. Although system 2800, as shown in FIG. 28, may include one particular set of operations or actions associated with particular modules, these operations or actions may be associated with different modules than the particular module illustrated here.

Process 2700 may include "receive input video frames of a video sequence" 2702, where the system may obtain access to pixel data of a video or picture frame that will be analyzed. The data may be obtained or read from RAM or ROM, or from another permanent or temporary memory, memory drive, or library. The access may be continuous access for analysis of an ongoing video stream for example.

Process 2700 may include "determine a learning rate of a scene" 2704. As explained above, this may include determining which group of reference frames to use in an input sequence and based on the complexity of the frames. In particular, the temporal and spatial complexity as well as the frame size may be used to determine total (high or low) complexity, as shown on the decision tree (table 1, FIG. 24A).

Process 2700 may include "form a cumulative segmentation mask that indicates activity of pixels or blocks of pixels in at least a portion of the scene" 2706. This includes using a number of activity thresholds, comparing the thresholds to difference magnitudes between a base frame and a number of reference frames, and then binarizing the results.

Process 2700 may include "determine at least one background threshold for the scene" 2708. This also is explained above and includes using a minimum value between two maximum value cumulative segmentation masks, where each segmentation mask is a total of the blocks or pixels that are active in the same number of combinations (reference frame-activity threshold combination).

Process 2700 may include "determine the background model with pixel accurate segmentation within blocks" 2710. This may include first forming the initial background model by selecting the combination that is closest (least SAD) to the background threshold applied to a frame of cumulative segmentation masks as described in the implementations above. Then, a block-based model may be converted to a pixel-accurate model by using error minimization equations as described above.

Process 2700 may include "provide the initial background model" 2711, and this may simply include permitting the segmentation loop unit access to the initial background model.

Process 2700 may include "determine segmentation threshold for a current frame" 2712. Particularly, this may include using spaced frames along the video sequence or scene in the input sequence to determine the threshold for a frame based on linear regression separate from the initial background model.

Process 2700 may include "form a current segmentation mask using background subtraction and the background model" 2714. Thus, the current segmentation mask may be formed by comparing the current threshold to the difference between the background model and the current frame. Process 2700 may then include "apply morphological opening and closing to adjust background or foreground indication on a pixel by pixel basis" 2716, and using the support structure as described herein.

Process 2700 may include "add newly uncovered background to the segmentation mask" 2718, and by setting and dividing an ROI, using edge, gradient, and motion cues to determine which parts of the ROI have low energy, and then removing these sections from the foreground area, and adding them to the background.

Process 2700 may include "finalize the segmentation mask" 2720, by removing noise and so forth, and then process 2700 may include "update the current background model" 2722, and with the finalized current segmentation mask. Thereafter, process 2700 may include "repeat for multiple frames until the end of the input sequence" 2724, and in which case the process loops back to operation 2712 to determine a new threshold for a new frame until the input sequence is complete. By one example, the input sequence may be less than all of the frames between two spaced frames (pd apart) used segmentation mask computations, and in one case may be the beginning portion of such part of a video sequence, and by one example is the first 25 frames after a base or start frame, or after the first frame in a video sequence. Process 2700 may include "provide the background model for further coding" 2726

In general, process 2700 may be repeated any number of times either in serial or in parallel, as needed. Furthermore, in general, logic units or logic modules, such as units 102 and 104 may be implemented, at least in part, by hardware, software, firmware, or any combination thereof. As shown, in some implementations, module 102/104 may be implemented via processor(s) 2803. In other implementations, module 102/104 may be implemented via hardware or software implemented via one or more other central processing unit(s). In general, module 102/104 and/or the operations discussed herein may be enabled at a system level. Some parts, however, for controlling the type of compression scheme or compression ratio used, may be provided or adjusted at a user level, for example.

While implementation of example process 200, 300, 900, 2200, 2300, or 2700 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

Referring to FIG. 28, an example video coding system 2800 for providing background-foreground segmentation of frames of a video sequence may be arranged in accordance with at least some implementations of the present disclosure. In the illustrated implementation, system 2800 may include one or more central processing units or processors 2803, a display device 2805, and one or more memory stores 2804. Central processing units 2803, memory store 2804, and/or display device 2805 may be capable of communication with one another, via, for example, a bus, wires, or other access. In various implementations, display device 2805 may be integrated in system 2800 or implemented separately from system 2800.

As shown in FIG. 28, and discussed above, the processing unit 2820 may have logic circuitry 2850 with an encoder 2852 and/or a decoder 2854. Either or both coders may have a background-foreground segmentation system 100 with a background model learning unit 102 and/or a segmentation loop unit 104 to provide many of the functions described herein and as explained with the processes described herein.

As will be appreciated, the modules illustrated in FIG. 28 may include a variety of software and/or hardware modules and/or modules that may be implemented via software or hardware or combinations thereof. For example, the modules may be implemented as software via processing units 2820 or the modules may be implemented via a dedicated hardware portion. Furthermore, the shown memory stores 2804 may be shared memory for processing units 2820, for example. Segmentation mask data may be stored on any of the options mentioned above, or may be stored on a combination of these options, or may be stored elsewhere. Also, system 2800 may be implemented in a variety of ways. For example, system 2800 (excluding display device 2805) may be implemented as a single chip or device having a graphics processor, a quad-core central processing unit, and/or a memory controller input/output (I/O) module. In other examples, system 2800 (again excluding display device 2805) may be implemented as a chipset.

Central processing units 2803 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 2804 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 2804 also may be implemented via cache memory. In various examples, system 2800 may be implemented as a chipset or as a system on a chip.

Figure 29:
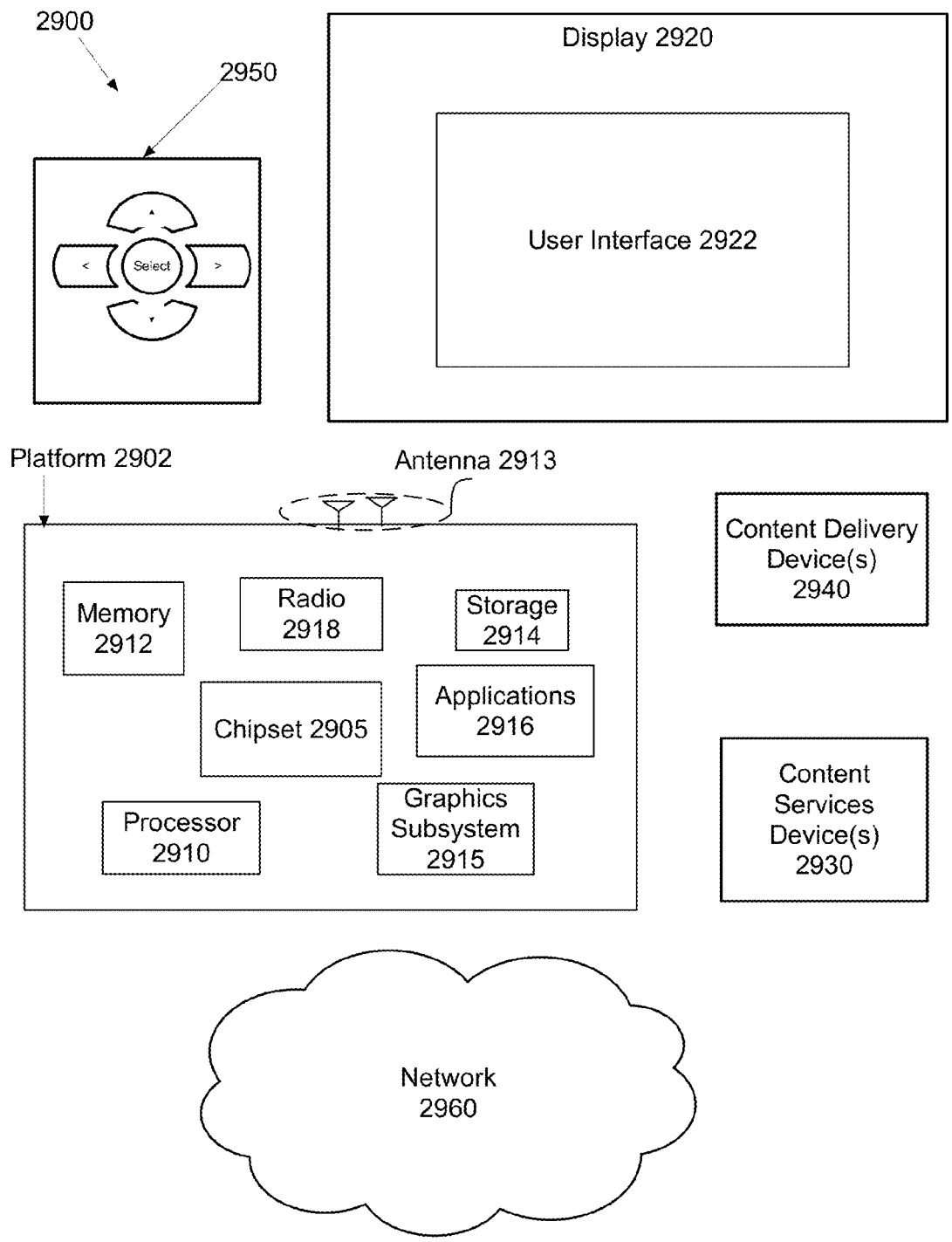
FIG. 29 is an illustrative diagram of another example system.

Referring to FIG. 29, an example system 2900 in accordance with the present disclosure and various implementations, may be a media system although system 2900 is not limited to this context. For example, system 2900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 2900 includes a platform 2902 communicatively coupled to a display 2920. Platform 2902 may receive content from a content device such as content services device(s) 2930 or content delivery device(s) 2940 or other similar content sources. A navigation controller 2950 including one or more navigation features may be used to interact with, for example, platform 2902 and/or display 2920. Each of these components is described in greater detail below.

In various implementations, platform 2902 may include any combination of a chipset 2905, processor 2910, memory 2912, storage 2914, graphics subsystem 2915, applications 2916 and/or radio 2918. Chipset 2905 may provide intercommunication among processor 2910, memory 2912, storage 2914, graphics subsystem 2915, applications 2916 and/or radio 2918. For example, chipset 2905 may include a storage adapter (not depicted) capable of providing intercommunication with storage 2914.

Processor 2910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2910 may be dual-core processor(s), dual-core mobile processor(s), and so forth.

Memory 2912 may be implemented as a volatile memory device such as, but not limited to, a Random Access Memory (RAM), Dynamic Random Access Memory (DRAM), or Static RAM (SRAM).

Storage 2914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2914 may include technology to increase the storage performance enhanced protection for valuable digital media when multiple hard drives are included, for example.

Graphics subsystem 2915 may perform processing of images such as still or video for display. Graphics subsystem 2915 may be a graphics processing unit (GPU) or a visual processing unit (VPU), for example. An analog or digital interface may be used to communicatively couple graphics subsystem 2915 and display 2920. For example, the interface may be any of a High-Definition Multimedia Interface, Display Port, wireless HDMI, and/or wireless HD compliant techniques. Graphics subsystem 2915 may be integrated into processor 2910 or chipset 2905. In some implementations, graphics subsystem 2915 may be a stand-alone card communicatively coupled to chipset 2905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 2918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2918 may operate in accordance with one or more applicable standards in any version.

In various implementations, display 2920 may include any television type monitor or display. Display 2920 may include, for example, a computer display screen, touch screen display, video monitor, television-like device, and/or a television. Display 2920 may be digital and/or analog. In various implementations, display 2920 may be a holographic display. Also, display 2920 may be a transparent surface that may receive a visual projection. Such projections may convey various forms of information, images, and/or objects. For example, such projections may be a visual overlay for a mobile augmented reality (MAR) application. Under the control of one or more software applications 2916, platform 2902 may display user interface 2922 on display 2920.

In various implementations, content services device(s) 2930 may be hosted by any national, international and/or independent service and thus accessible to platform 2902 via the Internet, for example. Content services device(s) 2930 may be coupled to platform 2902 and/or to display 2920. Platform 2902 and/or content services device(s) 2930 may be coupled to a network 2960 to communicate (e.g., send and/or receive) media information to and from network 2960. Content delivery device(s) 2940 also may be coupled to platform 2902 and/or to display 2920.

In various implementations, content services device(s) 2930 may include a cable television box, personal computer, network, telephone, Internet enabled devices or appliance capable of delivering digital information and/or content, and any other similar device capable of unidirectionally or bidirectionally communicating content between content providers and platform 2902 and/display 2920, via network 2960 or directly. It will be appreciated that the content may be communicated unidirectionally and/or bidirectionally to and from any one of the components in system 2900 and a content provider via network 2960. Examples of content may include any media information including, for example, video, music, medical and gaming information, and so forth.

Content services device(s) 2930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2902 may receive control signals from navigation controller 2950 having one or more navigation features. The navigation features of controller 2950 may be used to interact with user interface 2922, for example. In implementations, navigation controller 2950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2950 may be replicated on a display (e.g., display 2920) by movements of a pointer, cursor, focus ring, or other visual indicators displayed on the display. For example, under the control of software applications 2916, the navigation features located on navigation controller 2950 may be mapped to virtual navigation features displayed on user interface 2922, for example. In implementations, controller 2950 may not be a separate component but may be integrated into platform 2902 and/or display 2920. The present disclosure, however, is not limited to the elements or in the context shown or described herein.

In various implementations, drivers (not shown) may include technology to enable users to instantly turn on and off platform 2902 like a television with the touch of a button after initial boot-up, when enabled, for example. Program logic may allow platform 2902 to stream content to media adaptors or other content services device(s) 2930 or content delivery device(s) 2940 even when the platform is turned "off." In addition, chipset 2905 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 2900 may be integrated. For example, platform 2902 and content services device(s) 2930 may be integrated, or platform 2902 and content delivery device(s) 2940 may be integrated, or platform 2902, content services device(s) 2930, and content delivery device(s) 2940 may be integrated, for example. In various implementations, platform 2902 and display 2920 may be an integrated unit. Display 2920 and content service device(s) 2930 may be integrated, or display 2920 and content delivery device(s) 2940 may be integrated, for example. These examples are not meant to limit the present disclosure.

In various implementations, system 2900 may be implemented as a wireless system, a wired system, or a combination of both. When implemented as a wireless system, system 2900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 29.

Figure 30:
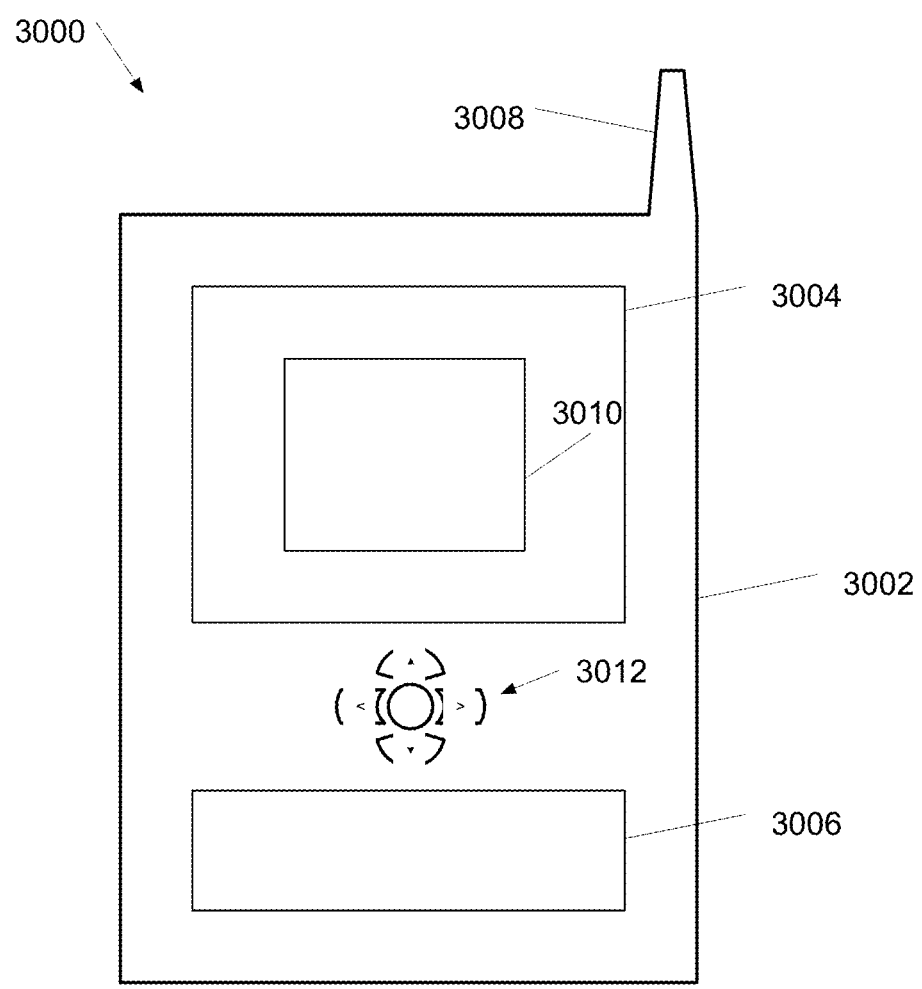
FIG. 30 illustrates another example device, all arranged in accordance with at least some implementations of the present disclosure.

As described above, system 2800 or 2900 may be implemented in varying physical styles or form factors. FIG. 30 illustrates implementations of a small form factor device 3000 in which system 2800 or 2900 may be implemented. In implementations, for example, device 3000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 30, device 3000 may include a housing 3002, a display 3004, an input/output (I/O) device 3006, and an antenna 3008. Device 3000 also may include navigation features 3012. Display 3004 may include any suitable display unit for displaying information appropriate for a mobile computing device. I/O device 3006 may include any suitable I/O device for entering information into a mobile computing device. Examples for I/O device 3006 may include an alphanumeric keyboard, a numeric keypad, a touch pad, input keys, buttons, switches, rocker switches, microphones, speakers, voice recognition device and software, and so forth. Information also may be entered into device 3000 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method for background-foreground segmentation comprises learning a background model of a base frame that comprises accumulating frame difference magnitudes between the base frame and each of a plurality of reference frames of a video sequence forming a scene, and comparing individual difference magnitudes to a plurality of activity thresholds to determine whether a pixel or block of pixels associated with the difference magnitude is active or inactive. The method also includes forming a plurality of cumulative segmentation masks that each are the amount of pixels or blocks of pixels with the same total of the number of frame reference-activity threshold combinations in which the pixels or block of pixels are active, and determining the background threshold used to assign the blocks or pixels to a background or a foreground of the base frame by using the cumulative segmentation masks.

By other approaches, the method comprises determining a learning rate of the scene depending on the complexity of the scene and to select the plurality of reference frames; selecting the plurality of reference frames that are at least generally farther along in the video sequence from the base frame the less complex the scene; wherein there are four or five reference frames selected for each defined level of complexity and eight activity thresholds; wherein determining the background threshold comprises selecting, as the background threshold, a minimum cumulative segmentation mask between two maximum cumulative segmentation masks along a numerical ordering of the cumulative segmentation masks by number of active combinations; wherein determining the background threshold comprises using a histogram to observe the maximum cumulative segmentation masks as peaks on the histogram and the minimum cumulative segmentation mask as the lowest valley between the peaks on the histogram; wherein blocks with cumulative segmentation mask totals above the background threshold are foreground blocks, and blocks with cumulative segmentation mask totals below the background threshold are background blocks; and determining pixel-accurate segmentation on a frame comprising finding a minimum difference between (1) a binarized frame based on the cumulative segmentation mask values and the background threshold, and (2) the frame binarized using one of the combinations.

A method of background-foreground segmentation for video coding comprises learning a background model, determining a background-foreground segmentation threshold for a current frame separately from the background model, forming a current segmentation mask by comparing the segmentation threshold to a difference between the current frame and the background model, applying morphological opening and closing to adjust background or foreground assignment of pixels or blocks on the segmentation mask, determining new uncovered background, updating the segmentation mask with the new uncovered background, and updating the background model with the new uncovered background.

By other approaches for this method, determining the background-foreground segmentation threshold comprises performing linear regression; wherein the current segmentation mask is in binarized form; the method comprising: updating the segmentation mask comprising using recovered background to modify the segmentation mask; and cleaning the segmentation mask by removing spikes and blobs to form a final segmentation mask; wherein updating the background model comprises one of: updating a count of pixels in the background, and updating an average pixel value associated with each background pixel location, and adding background pixels of the current segmentation mask to the existing background model and creating a running average; wherein applying morphological opening and closing comprises using a 2×2 support region as a sliding window, and changing one of the locations in the support region between background and foreground and depending on the background or foreground assignment at at least one of the other locations in the support region; wherein determining new uncovered background comprises: creating a region of interest (ROI) around the current foreground-background boundary splitting ROI into parts; marking low energy areas inside of the ROI parts; and classifying low energy associated with background; wherein marking low energy areas comprises forming an energy map comprising: computing edge cues; computing gradient cues; computing motion cues; and fusing the cues into the energy map.

The method also comprises computing edge cues using a canny edge detector; computing gradient cues using magnitude of the horizontal and vertical gradients; and computing motion cues using absolute differences of the current and previous frame; finalizing the segmentation mask before using the segmentation mask to update the background model, the finalizing comprising at least smoothing of the segmentation mask by deleting 2-pel wide scan lines scanned both horizontally and vertically; wherein the segmentation mask is one of: a segmentation mask comprising a background region and a foreground region, and a segmentation map of at least one foreground object and at least one background object; the method comprising altering coding quality of a background or foreground region of interest (ROI) in the background or foreground of a frame, or foreground object or background object within a frame of the video sequence and being encoded by at least one of: a standard based non-scalable encoder using at least one of: H.264 standard, HEVC standard, a scalable encoder using at least one of: SVC standard, SHVC standard, a nonstandard encoder using at least one of: VP8, VP9; wherein altering coding quality comprises one of: (1) altering the coding quality of a foreground region or a foreground object comprising improving coding quality of the foreground region or object by using, during video encoding, a lower quantization parameter (qp) for transform coding of blocks forming the foreground region or object as compared to the qp used for other areas of the frame, (2) altering the coding quality of a background region or a background object comprising reducing coding quality of the background region or object by using, during video encoding, a higher quantization parameter (qp) for transform coding of blocks forming the background region or object as compared to the qp used for other areas of the frame, and (3) both (1) and (2), and (4) altering the coding quality of a background region or a background object comprising improving coding quality of the background region or object by using, during video encoding, a lower quantization parameter (qp) for transform coding of blocks forming the background region or object as compared to the qp used for other areas of the frame; wherein learning the background model comprises: accumulating frame difference magnitudes between a base frame and each of a plurality of reference frames of a video sequence forming a scene; comparing individual difference magnitudes to a plurality of activity thresholds to determine whether a pixel or block of pixels associated with the difference magnitude is active or inactive; forming a plurality of cumulative segmentation masks that each are the amount of pixels or blocks of pixels with the same total of the number of frame reference-activity threshold combinations in which the pixels or block of pixels are active; and determining the background threshold used to assign the blocks or pixels to a background or a foreground of the base frame by using the cumulative segmentation masks.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of background foreground segmentation for video coding, comprising:
    learning a background model of a base frame comprising:
    accumulating frame difference magnitudes between the base frame and each of a plurality of reference frames of a video sequence forming a scene;
    comparing individual difference magnitudes to a plurality of activity thresholds to determine whether a pixel or block of pixels associated with the difference magnitude is active or inactive;
    forming a plurality of cumulative segmentation masks that each are the amount of pixels or blocks of pixels with the same total of the number of frame reference-activity threshold combinations in which the pixels or block of pixels are active, wherein the frame reference-activity threshold combination is one reference frame and one activity threshold used with a difference magnitude and available from the plurality of activity thresholds and the plurality of reference frames: and
    determining the background threshold used to assign the blocks or pixels to a background or a foreground of the base frame by using the cumulative segmentation masks.

2. The method of claim 1 comprising determining a learning rate of the scene depending on the complexity of the scene and to select the plurality of reference frames.

3. The method of claim 2 comprising selecting the plurality of reference frames that are at least generally farther along in the video sequence from the base frame the less complex the scene.

4. The method of claim 1 wherein there are four or five reference frames selected for each defined level of complexity and eight activity thresholds.

5. The method of claim 1 wherein determining the background threshold comprises selecting, as the background threshold, a minimum cumulative segmentation mask between two maximum cumulative segmentation masks along a numerical ordering of the cumulative segmentation masks by number of frame reference-activity threshold combinations in which the pixels or block of pixels are active.

6. The method of claim 5 wherein determining the background threshold comprises using a histogram to observe the maximum cumulative segmentation masks as peaks on the histogram and the minimum cumulative segmentation mask as the lowest valley between the peaks on the histogram.

7. The method of claim 5 wherein blocks with cumulative segmentation mask totals above the background threshold are foreground blocks, and blocks with cumulative segmentation mask totals below the background threshold are background blocks.

8. The method of claim 1 comprising determining pixel-accurate segmentation on a frame comprising finding a minimum difference between (1) a binarized frame based on the cumulative segmentation mask values and the background threshold, and (2) the frame binarized using one of the frame reference-activity threshold combinations.

9. The method of claim 1 comprising:
determining a learning rate of the scene depending on the complexity of the scene and to select the plurality of reference frames;
selecting the plurality of reference frames that are at least generally farther along in the video sequence from the base frame the less complex the scene;
wherein there are four or five reference frames selected for each defined level of complexity and eight activity thresholds;
wherein determining the background threshold comprises selecting, as the background threshold, a minimum cumulative segmentation mask between two maximum cumulative segmentation masks along a numerical ordering of the cumulative segmentation masks by number of frame reference-activity threshold combinations in which the pixels or block of pixels are active;
wherein determining the background threshold comprises using a histogram to observe the maximum cumulative segmentation masks as peaks on the histogram and the minimum cumulative segmentation mask as the lowest valley between the peaks on the histogram;
wherein blocks with cumulative segmentation mask totals above the background threshold are foreground blocks, and blocks with cumulative segmentation mask totals below the background threshold are background blocks; and
determining pixel-accurate segmentation on a frame comprising finding a minimum difference between (1) a binarized frame based on the cumulative segmentation mask values and the background threshold, and (2) the frame binarized using one of the frame reference-activity threshold combinations.

10. A method of background-foreground segmentation for video coding comprising:
learning a background model of a base frame comprising:
accumulating frame difference magnitudes between the base frame and each of a plurality of reference frames of a video sequence forming a scene:
comparing individual difference magnitudes to a plurality of activity thresholds to determine whether a pixel or block of pixels associated with the difference magnitude is active or inactive:
forming a plurality of cumulative segmentation masks that each are the amount of pixels or blocks of pixels with the same total of the number of frame reference-activity threshold combinations in which the pixels or block of pixels are active, wherein the frame reference-activity threshold combination is one reference frame and one activity threshold used with a difference magnitude and available from the plurality of activity thresholds and the plurality of reference frames; and
determining the background threshold used to assign the blocks or pixels to a background or a foreground of the base frame by using the cumulative segmentation masks;
determining a background-foreground segmentation threshold for a current frame separately from the background model;
forming a current segmentation mask by comparing the segmentation threshold to a difference between the current frame and the background model;
applying morphological opening and closing to adjust background or foreground assignment of pixels or blocks on the segmentation mask;
determining new uncovered background;
updating the segmentation mask with the new uncovered background; and
updating the background model with the new uncovered background.

11. The method of claim 10 wherein determining the background-foreground segmentation threshold comprises performing linear regression.

12. The method of claim 10 wherein the current segmentation mask is in binarized form.

13. The method of claim 10 comprising:
updating the segmentation mask comprising using recovered background to modify the segmentation mask; and
cleaning the segmentation mask by removing spikes and blobs to form a final segmentation mask.

14. The method of claim 10 wherein updating the background model comprises updating a count of pixels in the background, and updating an average pixel value associated with each background pixel location.

15. The method of claim 10 wherein applying morphological opening and closing comprises using a 2×2 support region as a sliding window, and changing one of the locations in the support region between background and foreground and depending on the background or foreground assignment at at least one of the other locations in the support region.

16. The method of claim 10, wherein determining new uncovered background comprises:
creating a region of interest (ROI) around the current foreground-background boundary splitting ROI into parts;
marking low energy areas inside of the ROI parts; and
classifying low energy associated with background.

17. The method of claim 16 wherein marking low energy areas comprises forming an energy map comprising:

computing edge cues;
computing gradient cues;
computing motion cues; and
fusing the cues into the energy map.

18. The method of claim 17 comprising:
computing edge cues using a canny edge detector;
computing gradient cues using magnitude of the horizontal and vertical gradients; and
computing motion cues using absolute differences of the current and previous frame.

19. The method of claim 10 comprising updating the background model comprising adding background pixels of the current segmentation mask to the existing background model and creating a running average.

20. The method of claim 10 comprising finalizing the segmentation mask before using the segmentation mask to update the background model, the finalizing comprising at least smoothing of the segmentation mask by deleting 2-pel wide scan lines scanned both horizontally and vertically.

21. The method of claim 10 wherein the segmentation mask is one of:
a segmentation mask comprising a background region and a foreground region, and
a segmentation map of at least one foreground object and at least one background object; the method comprising altering coding quality of a background or foreground region of interest (ROI) in the background or foreground of a frame, or foreground object or background object within a frame of the video sequence and being encoded by at least one of:
a standard based non-scalable encoder using at least one of:
H.264 standard,
HEVC standard,
a scalable encoder using at least one of:
SVC standard
SHVC standard,
a nonstandard encoder using at least one of:
VP8,
VP9.

22. The method of claim 21 wherein altering coding quality comprises one of:
altering the coding quality of a foreground region or a foreground object comprising improving coding quality of the foreground region or object by using, during video encoding, a lower quantization parameter (qp) for transform coding of blocks forming the foreground region or object as compared to the qp used for other areas of the frame,
altering the coding quality of a background region or a background object comprising reducing coding quality of the background region or object by using, during video encoding, a higher quantization parameter (qp) for transform coding of blocks forming the background region or object as compared to the qp used for other areas of the frame, and
both.

23. The method of claim 21 wherein altering the coding quality of a background region or a background object comprises improving coding quality of the background region or object by using, during video encoding, a lower quantization parameter (qp) for transform coding of blocks forming the background region or object as compared to the qp used for other areas of the frame.

24. The method of claim 10 wherein the background-foreground segmentation threshold comprises performing linear regression;

wherein the current segmentation mask is in binarized form;
the method comprising:
updating the segmentation mask comprising using recovered background to modify the segmentation mask; and
cleaning the segmentation mask by removing spikes and blobs to form a final segmentation mask;
wherein updating the background model comprises one of:
updating a count of pixels in the background, and updating an average pixel value associated with each background pixel location, and
adding background pixels of the current segmentation mask to the existing background model and creating a running average;
wherein applying morphological opening and closing comprises using a 2×2 support region as a sliding window, and changing one of the locations in the support region between background and foreground and depending on the background or foreground assignment at at least one of the other locations in the support region;
wherein determining new uncovered background comprises:
creating a region of interest (ROI) around the current foreground-background boundary
splitting ROI into parts;
marking low energy areas inside of the ROI parts; and
classifying low energy associated with background;
wherein marking low energy areas comprises forming an energy map comprising:
computing edge cues;
computing gradient cues;
computing motion cues; and
fusing the cues into the energy map;
the method comprising:
computing edge cues using a canny edge detector;
computing gradient cues using magnitude of the horizontal and vertical gradients; and
computing motion cues using absolute differences of the current and previous frame;
finalizing the segmentation mask before using the segmentation mask to update the background model, the finalizing comprising at least smoothing of the segmentation mask by deleting 2-pel wide scan lines scanned both horizontally and vertically;
wherein the segmentation mask is one of:
a segmentation mask comprising a background region and a foreground region, and
a segmentation map of at least one foreground object and at least one background object;
the method comprising altering coding quality of a background or foreground region of interest (ROI) in the background or foreground of a frame, or foreground object or background object within a frame of the video sequence and being encoded by at least one of:
a standard based non-scalable encoder using at least one of:
H.264 standard,
HEVC standard,
a scalable encoder using at least one of:
SVC standard
SHVC standard,
a nonstandard encoder using at least one of:
VP8,
VP9;

wherein altering coding quality comprises one of:
- (1) altering the coding quality of a foreground region or a foreground object comprising improving coding quality of the foreground region or object by using, during video encoding, a lower quantization parameter (qp) for transform coding of blocks forming the foreground region or object as compared to the qp used for other areas of the frame,
- (2) altering the coding quality of a background region or a background object comprising reducing coding quality of the background region or object by using, during video encoding, a higher quantization parameter (qp) for transform coding of blocks forming the background region or object as compared to the qp used for other areas of the frame, and
- (3) both (1) and (2), and
- (4) altering the coding quality of a background region or a background object comprising improving coding quality of the background region or object by using, during video encoding, a lower quantization parameter (qp) for transform coding of blocks forming the background region or object as compared to the qp used for other areas of the frame.

25. The method of claim 10 wherein determining the background threshold comprises selecting, as the background threshold, a minimum cumulative segmentation mask between two maximum cumulative segmentation masks along a numerical ordering of the cumulative segmentation masks by number of frame reference-activity threshold combinations in which the pixels or block of pixels are active.

* * * * *